United States Patent
Smith

(10) Patent No.: US 6,973,308 B1
(45) Date of Patent: Dec. 6, 2005

(54) COMMUNICATION SYSTEM WITH FLOATING CALL ANCHOR

(75) Inventor: Malcolm M. Smith, Calgary NW (CA)

(73) Assignee: Cisco Technology, Inc., San Jose, CA (US)

( * ) Notice: Subject to any disclaimer, the term of this patent is extended or adjusted under 35 U.S.C. 154(b) by 545 days.

(21) Appl. No.: 09/996,511

(22) Filed: Nov. 27, 2001

(51) Int. Cl.[7] .............................................. H04Q 7/20
(52) U.S. Cl. ...................... 455/436; 455/437; 455/438; 455/439; 455/445; 370/331
(58) Field of Search .......................... 455/432.1, 435.1, 455/435.2, 436, 437, 438, 439, 442, 443, 455/444, 445, 453; 370/310.2, 322, 331, 370/332

(56) References Cited

U.S. PATENT DOCUMENTS

| | | | | |
|---|---|---|---|---|
| 5,590,172 | A | * | 12/1996 | Lodwig et al. ............. 455/436 |
| 5,850,607 | A | * | 12/1998 | Muszynski .................. 455/442 |
| 5,940,762 | A | * | 8/1999 | Lee et al. .................... 455/442 |
| 6,009,326 | A | * | 12/1999 | Roder et al. ................ 455/436 |
| 6,072,790 | A | | 6/2000 | Neumiller et al. |
| 6,108,547 | A | | 8/2000 | Yamashita et al. |
| 6,108,548 | A | | 8/2000 | Furukawa et al. |
| 6,141,559 | A | | 10/2000 | Neumiller et al. |
| 6,216,004 | B1 | | 4/2001 | Tiedemann, Jr. et al. |
| 6,295,452 | B1 | | 9/2001 | Choi |
| 6,330,449 | B1 | | 12/2001 | Kim |
| 6,341,222 | B1 | * | 1/2002 | Neumiller et al. ........ 455/422.1 |
| 6,353,602 | B1 | | 3/2002 | Cheng et al. |
| 6,353,607 | B1 | * | 3/2002 | Valentine et al. ........... 370/349 |
| 6,381,458 | B1 | | 4/2002 | Frodigh et al. |
| 6,421,539 | B1 | | 7/2002 | Jeong |
| 6,466,556 | B1 | * | 10/2002 | Boudreaux ................. 370/331 |
| 6,519,457 | B1 | * | 2/2003 | Jiang et al. ................. 455/442 |
| 6,594,243 | B1 | | 7/2003 | Huang et al. |
| 6,707,803 | B1 | | 3/2004 | Suk |
| 2002/0012326 | A1 | | 1/2002 | Chang |

* cited by examiner

Primary Examiner—Stephen M. D'Agosta
(74) Attorney, Agent, or Firm—Baker Botts L.L.P.

(57) ABSTRACT

A floating call anchor is used to improve the efficiency of utilization of wireless and backhaul resources in cellular communication systems. For conditions under which soft handoff can be effectively used to conserve wireless resources, data transmitted from a first mobile unit (MU) via a wireless signal are received by one or more base transceiver stations (BTSs) and sent to a base station controller (BSC) or other device remote from the BTSs. The data are then sent from the remote device to the BTS(s) transmitting data to a second MU. If the two MUs engaged in communication are within the same cell or adjacent cells, and the savings of backhaul resources outweighs the additional wireless resource costs associated with performing the call anchor function at a BTS, then a single BTS is used to communicate with both MUs. This single BTS performs the call anchor function.

20 Claims, 10 Drawing Sheets

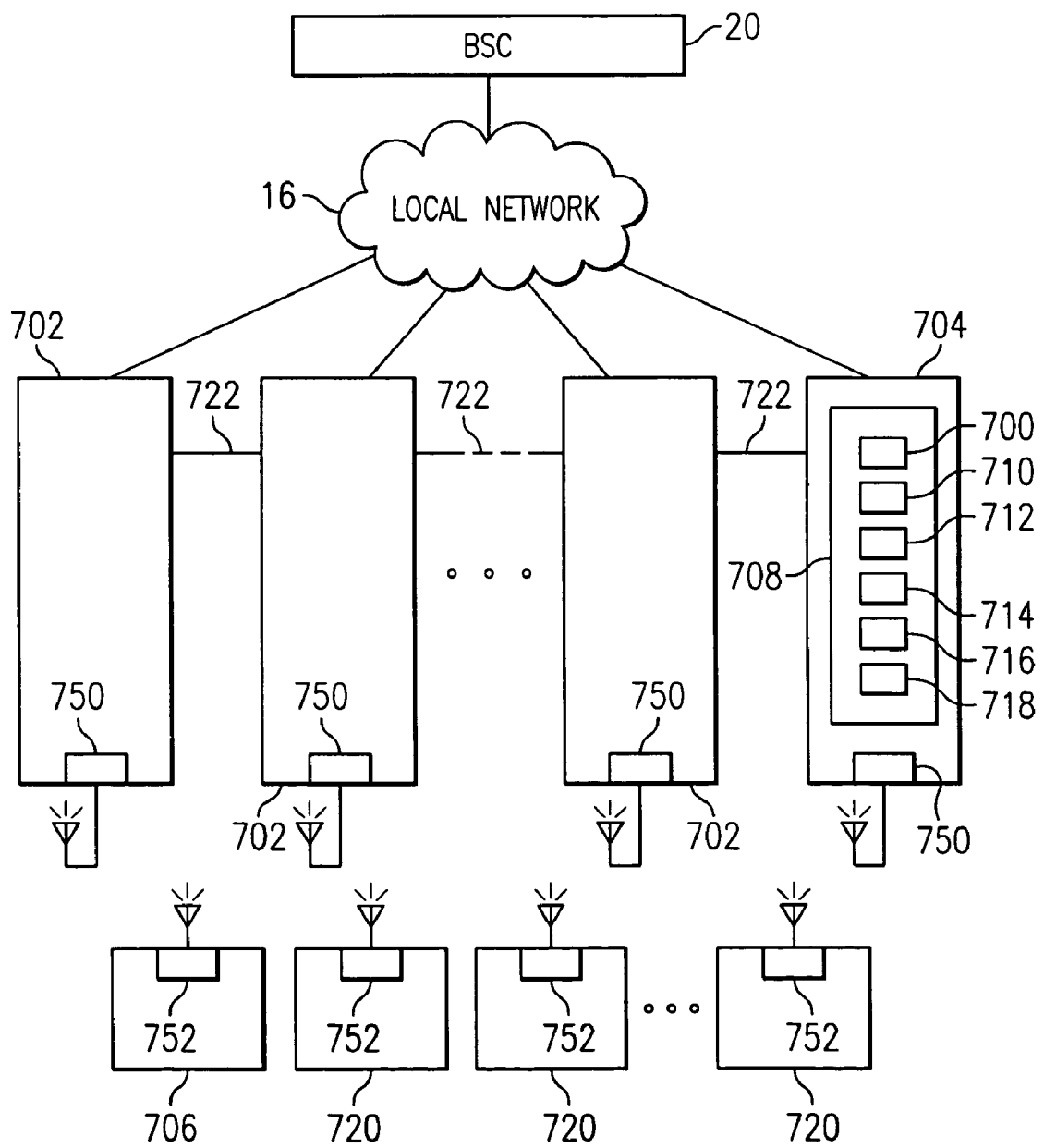

COMMUNICATION SYSTEM WITH FLOATING CALL ANCHOR

TECHNICAL FIELD OF THE INVENTION

The present invention relates in general to a communication system and more particularly to a communication system with floating call anchor.

BACKGROUND OF THE INVENTION

Typical cellular communication systems include base transceiver stations (BTSs) that engage in wireless communication with mobile devices such as cellular phones. An example of such a system is illustrated in FIG. 1. The BTSs 14 of the illustrated system connect to at least one base station controller (BSC) 20 through a local network 16, and transmit and receive phone calls and other data using circuit-switched, time division multiplexed communications protocols, virtual circuit, asynchronous transfer mode (ATM) protocols, and/or other communications protocols. The term "local network" as used herein refers to a network served by a particular BSC 20. The local network 16 is typically an Internet protocol (IP) network, and can generally be considered part of a wider communication network having other portions which can include, for example, other local cellular networks and/or other types of networks such as the Internet. The other network portions can be referred to, with respect to the local network 16, as "outside" network portions. The local network 16 communicates to the outside network portions through a gateway 18.

FIG. 2 illustrates an example of a gateway 18 for use in the cellular communication system of FIG. 1. The gateway 18 includes an interface 40 for communicating with outside network portions, an interface 42 for communicating with the local network 16, a processor 44, and a data storage device 46 which stores information for use by the other components of the gateway 18. The stored information can include, for example, programs for execution by the processor 44.

A mobile device—a/k/a a "mobile unit" (MU) 12—engages in direct wireless communication with one or more of the BTSs 14 in order to ultimately communicate with another end-user device such as another MU or a hard-wired telephone (a/k/a a "land line"). The other end-user device can be within the geographic region served by the local network or can be elsewhere in the wider network—e.g., in an outside network portion.

A typical cellular network—which can include one or more local networks—covers a contiguous area that is divided into multiple cells. Each cell is served by a BTS 14 which provides a wireless link for at least one MU 12 (e.g., a cellular phone) within the cell. The wireless link—which in many systems operates within the radio-frequency (RF) spectrum—is used to transmit electromagnetic data signals representing data being sent between the MU 12 and the BTS 14.

Consider an MU 12 which is engaged in a communication session (e.g., a telephone call). As the MU 12 moves among the cells, the session (i.e., the call) is handed off among the BTSs 14 in order to provide continuous coverage.

Typically, a BSC 20 controls call set-up within the BTSs 14, and inter-cell operations such as handoffs among the BTSs 14. In addition, the BSC 20 in conventional systems generally collects information about the respective BTSs 14 and controls the wireless communication parameters of the BTSs 14, such as transmission strength and modulation parameters. During call handoff, a local handoff controller 806 is used to control the allocation of resources among the other devices—e.g., the BSC 20 and the BTSs 14—which are connected to the local network 16.

For "uplink" communications—i.e., communications sent from a cellular phone or other MU 12—it is common to utilize multiple BTSs 14 to receive data from the MU 12. In conventional systems, the best-quality data signals from one or more of the BTSs 14 are selected by the BSC 20 in order to improve the quality of reception, as is well-known in the art. Typically, the stream of data transmitted from the MU 12 is broken into "frames" (i.e., portions of selected size).

For "downlink" communications—i.e., communications sent from one or more BTSs 14 to the MU 12—multiple BTSs 14 can send signals to a single MU 12 in order to improve the quality of reception, as is well-known in the art.

The above-described functions of: (1) selecting uplink signals received by multiple BTSs 14, and (2) distributing downlink signals through multiple BTSs 14 to a single MU 12, are typically performed by a software and/or hardware system called a "selection and distribution unit" (SDU). The SDU controls various characteristics of the digital transmission of the data to and from each MU. Such characteristics typically include parameters such as frame size and allocation of digital capacity such as bit transmission and processing capacity. In conventional systems, the SDU function is performed by the BSC 20. In addition, the allocation of wireless resources (e.g., wireless bandwidth) to an MU is also performed by the BSC 20. In particular, the BSC 20 also includes a wireless resource allocation function that assigns wireless bandwidth, spreading codes (e.g., Walsh codes), and/or time slots to the respective MUs connected to the local network 16. Moreover, digital transmission parameters such as digital capacity allocation are related to the quantity of wireless resources being used. For example, the digital capacity and the wireless capacity allocated to a particular MU must together increase with increasing data transmission rate. The BSC typically coordinates the SDU function and the wireless resource allocation function such that the allocation of wireless resources matches the allocation of digital resources.

However, the wireless resource requirements of an MU 12 tend to change as the MU 12 moves, and therefore, for optimal effectiveness of communication, it is desirable to update and adjust the allocation of wireless resources among one or more moving MUs. Yet, the BSC 20 is generally at a physical location which is remote from the BTSs 14. Consequently, there is a delay in the transmission, from the BTSs 14, of information regarding MU location. In addition, there is a delay in the transmission of control commands from the BSC 20 to the respective BTSs 14. Therefore, the adjustment of the BTSs 14 tends to lag behind the changes in MU location, resulting in sub-optimal resource allocation and consequent reduction of the efficiency of the wireless communication.

Furthermore, exclusive reliance on a single device—the BSC 20—to perform the SDU and wireless allocation functions increases the probability of loss of all communication channels passing through the BTSs 14 connected to the local network 16, because there is no alternative device which can replace the BSC 20 in the performance of the aforementioned functions. If the BSC 20 fails, the system will lose communication with all of the local BTSs 14. The consequences to users can be severe, because these BTSs 14 typically number in the thousands for a single local network.

Soft handoff techniques which utilize more than one BTS have advantages and disadvantages. For example, in the uplink direction, using more BTSs to receive a signal coming from the MU 12 increases the quality of reception without requiring the MU 12 to broadcast its signal with a high power level. Utilizing a high power level in the uplink direction "steals" capacity from other users and/or cells, because wireless capacity is a function not only of frequency bandwidth but of dynamic range as well. Therefore, in some cases, it can be preferable to use multiple BTSS.

In the downlink direction, using multiple BTSs to transmit a signal to a particular MU 12 can also increase the quality of reception. Such a technique tends to require each of the BTSs 14 to send signals to an increased number of users, however, thereby requiring the BTSs 14 to expend capacity (i.e. bandwidth and/or power) that could otherwise be used to transmit data to other MUs. In particular, if one or more BTSs 14 are required to transmit a wireless signal to a very distant MU—which is more likely to be the case if multiple BTSs are used—the wireless signal must be transmitted using a high power level, thereby putting a large burden on the wireless capacity of the system.

In some cases, two MUs are engaged in a communication session while both are connected, through one or more BTSs, to the same local network. Such conditions can be further understood with reference to FIG. 7d. In conventional systems, data originating from the first MU 706 are transmitted through the airwaves to one or more BTSs 702 and 704, and are then sent through one or more high-capacity uplink communication lines 726 into the local network 16 which sends the data to a BSC 20. The BSC 20 then transmits the data back into the local network 16, from which they are then sent through one or more high-capacity downlink lines 724 into one or more of the BTSs 702 and 704 which transmit the data in the form of wireless data signals to the second MU 720.

On the other hand, if the BTS(s) serving one MU is/are connected to a local network that is separate from that of the BTS(s) serving another MU, then data being transmitted between the two MUs typically passes through a "higher level" device than the BSC 20—i.e., a device serving a wider, broader portion of the cellular network. For example, with reference to FIG. 7d, if the second MU 720 does not have a wireless link to any BTS directly connected to the same local network 16 as the first MU 706, then data originating from the first MU 706 are typically sent through a gateway 18 out of the network 16 where they originated, and received—possibly through a mobile switching center 732—by a network 728 connected to one or more BTSs 730 in wireless communication with the second MU 720. In general, the highest-level device through which the data pass as they travel between the MUs can be referred to as the site of the "call anchor" function. For example, consider a call in which the data transmitted between two MUs 706 and 720 never leave the local network 16 and the devices connected thereto. Data originating from the first MU 706 are received by one or more BTS 702 and/or 704 and are sent through the local network 16 to the BSC 20. The BSC 20 sends the data back through the same local network 16 to one or more of the BTSs 702 and/or 704 connected to the local network 16. The BTSs 702 and/or 704 transmit the data to the second MU 720. Similarly, data originating from the second MU 720 are sent through the BTSs 702 and/or 704 to the network 16, and then to the BSC 20. The BSC 20 sends the data back through the network 16, and then through the BTSs 702 and/or 704, to the first MU 706. In the foregoing example, the BSC 20 would typically be considered the site of the call anchor function 740. Alternatively, if the first MU 706 is linked to the BTSs of a first local network 16, and the second MU 720 is linked to the BTSs of a second network 728, then the call anchor device would typically be a device connecting the two local networks. For example, a mobile switching center 732 can serve as the site of the call anchor function 740.

A disadvantage of performing the call anchor function within a BSC, a mobile switching center, or another device remote from the BTSs is that additional high-capacity communication resources—e.g., additional high-capacity lines or greater transmission capacity within the lines—are required to transmit the data from the sender's BTSs to the call anchor, and back down to the recipient's BTSs. As discussed above, purchase and/or usage of high capacity lines is expensive, and therefore, using a call anchor located remotely from the BTSs can increase the cost of the system by causing additional backhaul load. Yet, conventional systems perform the call anchor function remotely from the BTSs, thereby producing undesirably large backhaul loads.

SUMMARY OF THE INVENTION

From the foregoing, it may be appreciated by those skilled in the art that a need has arisen for a communications system which can maintain SDU functionality in an optimum location in an environment having changing data traffic characteristics and physically moving MUs.

In addition, there is a need for a communication system which can maintain call anchor functionality in an optimum location in an environment having changing data traffic characteristics and physically moving MUs.

It is therefore an object of the present invention to provide a communication system in which the location of the SDU function can be dynamically changed in order to accommodate the changing locations of the MUs and the changing traffic characteristics of data carried by the system.

It is a further object of the present invention to provide a communication system which can rapidly reallocate wireless bandwidth to accommodate the changing locations of the MUs and the changing characteristics of data being carried by the system.

It is yet another object of the present invention to provide efficient use of wireless and backhaul resources. It is an additional object of the present invention to provide a communications system in which the location of the call anchor function can be dynamically changed in order to accommodate the changing data traffic characteristics and the changing locations of the MUs.

These and other objects are accomplished by a communication system comprised of a base transceiver station engaged in wireless communication with a first mobile unit and carrying data being transmitted between the first mobile unit and a second mobile unit. The communication system further comprised of an other communication device in communication with the base transceiver station, wherein one of the base transceiver station and the other communication device is dynamically selected, by a selection procedure, to perform a call anchor function for the data. The selection procedure is comprised of determining a communication characteristic comprising at least one of a traffic characteristic of the data and a characteristic of wireless communication between the base transceiver station and at least one of the first and second mobile units.

BRIEF DESCRIPTION OF THE DRAWINGS

For a more complete understanding of the present invention, reference is now made to the following description taken in conjunction with the accompanying drawings, wherein like reference numbers represent like parts, in which:

FIG. 7a is a block diagram of a cellular communication system in accordance with the present invention;

DETAILED DESCRIPTION OF THE INVENTION

Figure 1:
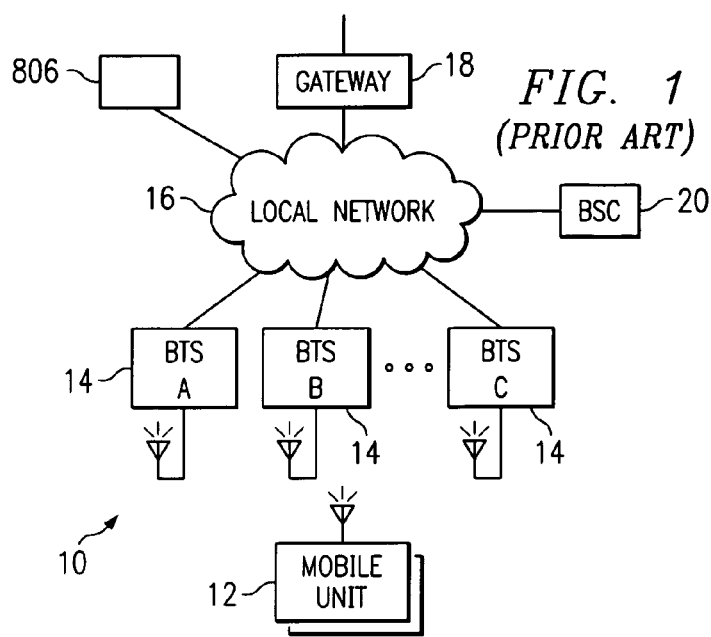
FIG. 1 is a block diagram of a cellular communication system.

In a cellular communication system according to the present invention, the SDU function can be considered a component of a "physical channel" function that can also include the functions of allocation of wireless resources, data multiplexing (MUX) and demultiplexing (de-MUX) during both uplink and downlink communications, and termination of other types of physical channels, such as dedicated data traffic channels and BTS control channels. The SDU function of the physical channel preferably includes combination (e.g., adding and/or averaging) of signals from multiple BTSs in order to improve reception quality.

A communication system in accordance with the present invention can, for example, perform wireless communication within the widely used 800 MHz cellular band, the widely used 1.9 GHz PCS band, or the 2.4 GHz band which is currently unlicensed. However, the present invention can be used for wireless communication at any frequency over any wireless and/or radio link, and the discussion herein is not meant to imply any limitation of the frequency range and/or electromagnetic spectrum within which the invention can be practiced.

A communication system in accordance with the present invention can utilize a "floating physical channel"—i.e., a physical channel function that can be shifted dynamically (i.e., in real time) from a BTS to the BSC, or from the BSC to the BTS. The choice of which device is to perform the physical channel function is based upon whether the value of more efficient use of wireless resources, associated with situating the physical channel in the BTS, outweighs the consequential cost of increased backhaul requirements.

As discussed above, BSCs in conventional systems typically coordinate the SDU function and the wireless resource allocation in order to ensure that the allocation of wireless resources matches the allocation of digital resources. In a system in accordance with the present invention, the coordination and matching is preferably performed by the same device that performs the physical channel function. Furthermore, coordination and matching are preferably performed rapidly in order to avoid delaying the adjustment of allocation of either digital or wireless resources. Yet, if the allocation of digital resources (performed by the SDU function) occurs at the BTS level of the system, and the allocation of wireless resource occurs at the BSC level, the matching is delayed by the time required to send status information and control commands between the two levels. In particular, there is a larger delay between the BTSs and the BSC than there is among the BTSs.

Therefore, if the SDU function is performed at the BTS level, the wireless resource allocation function is preferably also performed at the BTS level. This can be ensured by including both the SDU function and the wireless resource allocation function within the physical channel function.

If the physical channel function is to be performed at the BTS level, a particular BTS is generally selected to perform this function. The selected BTS can be referred to as the "primary" BTS (item 378 of the system illustrated in FIG. 5). The other BTSs 382 can be referred to as "secondary" BTSs. Because there are generally no high-capacity links directly connecting the various BTSs, the data sent to and from the MU 12 typically travels to and from the primary BTS 378 through the local network 16 which performs the necessary communication with the secondary BTSs 382. Specifically, wireless uplink data signals 502 are sent from the MU 12, via wireless links 412, to the secondary BTSs 382 which convert the wireless data signals 502 into digital data signals 510 representing the data being communicated. The digital data signals 510 are sent into the IP network 16 through high-capacity (typically "T1") communication lines 404 capable of quickly transmitting large quantities of data. The data are then sent—in the form of digital data signals 516—from the IP network 16 through an additional high-capacity communication line 406 to the primary BTS 378. The primary BTS 378 also receives its own copies of the wireless data signals 502 directly, through a wireless link 414, from the MU 12. Optionally, the SDU component of the physical channel function can include selection of digital data signals corresponding to the best quality wireless data signal or signals received by the primary BTS 378 and the secondary BTSs 382. Furthermore, the selection need not be based solely upon which signals, considered in their entirety, have the best quality. The selection can also be based which portions of the wireless signals have the best quality. Determination of signal quality can be based upon one or more characteristics of the wireless data signals—or portions thereof. For example, high signal quality can be associated with high signal-to-noise ratio (SNR), high signal-to-interference ratio (SIR), high energy-per-bit (Eb), low error-per-bit, and/or satisfactory results from an error detection procedure such as the well-known Cyclic Redundancy Check (CRC). The selection procedure is preferably performed on a frame-by-frame basis. Preferably, the SDU component of the physical channel function includes combination of digital data signals corresponding to two or more of the wireless data signals 502 received by the primary BTS 378 and the secondary BTSs 382. The combination procedure preferably includes adding and/or averaging of the respective amplitudes and/or power levels of the wireless data signals 502, and is preferably performed on a frame-by-frame basis.

The primary BTS 378 uses a high-capacity line 410 to communicate the selected or combined data—in the form of digital data signals 514—back into the IP network 16, from which they are transmitted, through an additional high-capacity line 424, to a gateway 18. The gateway 18 is connected to an outside network portion 372. The outside network portion 372 delivers the data to their ultimate destination.

In the downlink direction, data are received, from the outside network portion 372, into the gateway 18 and are transmitted, through a high-capacity line 426, into the IP network 16. The data are then transmitted, in the form of digital data signals 516, from the IP network 16, through high-capacity line 406, to the primary BTS 378. The primary BTS 378 distributes the downlink data to the various secondary BTSs 382 by sending the data—in the form of digital data signals 514—through high-capacity line 410 into the IP network 16, from which the data are distributed—in the form of digital data signals 512—to the secondary BTSs 382 through additional high-capacity lines 408. The secondary BTSs 382 then communicate the data in the form of wireless data signals 504 to the MU 12 using wireless transmission—i.e., through wireless paths 412. In addition, the primary BTS 378 sends data signals 504 directly to the MU 12 through wireless link 414.

A drawback of using the primary BTS 378 to perform the physical channel function is that, as discussed above, uplink data coming from a secondary BTS 382 do not simply travel into the local network 16 and then through the gateway 18 into the outside network portion 372. Instead, uplink data coming from the secondary BTS 382 travel through a high-capacity communication line 404 into the IP network 16, and through another high-capacity communication line 406 into the primary BTS 378. Processed data generated by the primary BTS 378 are then sent from the primary BTS 378, through yet another high-capacity line 410, back into the IP network 16, from which the data are transmitted through the gateway 18 into the outside network portion 372. The transmission of data among the BTS and BSC is commonly referred to as "backhaul." Because high-capacity communication lines are expensive, using the primary BTS 378 to perform the physical channel function can significantly increase the cost of the system by requiring increased backhaul capacity.

Similarly, in the downlink direction, if the primary BTS 378 is used to perform the physical channel function, data to be transmitted to the MU 12 through a secondary BTS 382 are not simply received into the local network 16 and distributed to the secondary BTSs 382. Rather, the downlink data travel through high-capacity line 406 into the primary BTS 378 which processes the data and sends the processed data back into the local network 16 through high-capacity line 410 for distribution. The data are distributed, through high-capacity lines 408, to the respective secondary BTSs 382. As a result, additional backhaul capacity is required.

In contrast, using the BSC 20 to perform the physical channel function eliminates the need to send uplink data down to a primary BTS 378 and back into the network 16, and also eliminates the need to send downlink data back up from the primary BTS 378 into the network 16 for distribution to the secondary BTSs 382. Uplink data from all BTSs connected to the MU 12 simply travel through a high-capacity line 420 to the BSC 20 where the data are processed—e.g., selected and/or combined by the SDU—before being sent to their ultimate destination.

Downlink data are received by the BSC 20 and sent, through an additional high-capacity line 422, into the local network 16 for distribution to all BTSs which are connected to the MU 12.

However, there are some advantages associated with performing the physical channel function within a BTS 378, rather than within the BSC 20. For example, using a BTS 378 to perform the physical channel function eliminates exclusive reliance on a single device—i.e., the BSC 20—for processing calls, thereby increasing the overall reliability of the system. In particular, if the primary BTS 378 fails, the physical channel function can be relocated to a different BTS—e.g., one of the secondary BTSs 382—which then becomes the primary BTS for one or more communication sessions and/or MUs. As a result, the system can continue to use those BTSs which are still functioning properly, thereby avoiding the loss of use of the many remaining BTSs (typically numbering in the thousands) connected to the local network 16. In other words, because there is no single point of failure of the local system, only a small fraction of the system's local capability is likely to be lost.

Furthermore, if a primary BTS 378 is used to perform the physical channel function, the processed data need not pass through the BSC 20 before being sent to their ultimate destination. Accordingly, because one step in the data routing process is eliminated, the data are transmitted more efficiently i.e., using a smaller quantity of digital communication capacity. In addition, performing the physical channel function—and accordingly, the wireless resource allocation function—within the BTS 378 can increase the efficiency of the system's usage of wireless bandwidth, because the allocation of wireless resources can be adjusted more rapidly.

In particular, during soft handoff from one BTS to another, the system gradually reduces the bandwidth allocated to the wireless link between the MU 12 and the BTS handing off the call, and gradually increases the bandwidth allocated to the link between the MU 12 and the BTS to which the call is being handed off. As the MU 12 physically changes location with respect to the various BTSs, the wireless resources allocated to each link to the MU 12 can change quite rapidly. If the physical channel function is located in the primary BTS 378 which is in direct communication with the MU 12, the adjustment of bandwidth allocation can be performed rapidly. In contrast, if the physical channel function is being performed by the BSC 20, there is a delay in the reallocation and adjustment of bandwidth resources due to the time required to communicate signal quality information and device control commands between the BSC 20 and the BTSs 378 and 382.

Figure 6A:
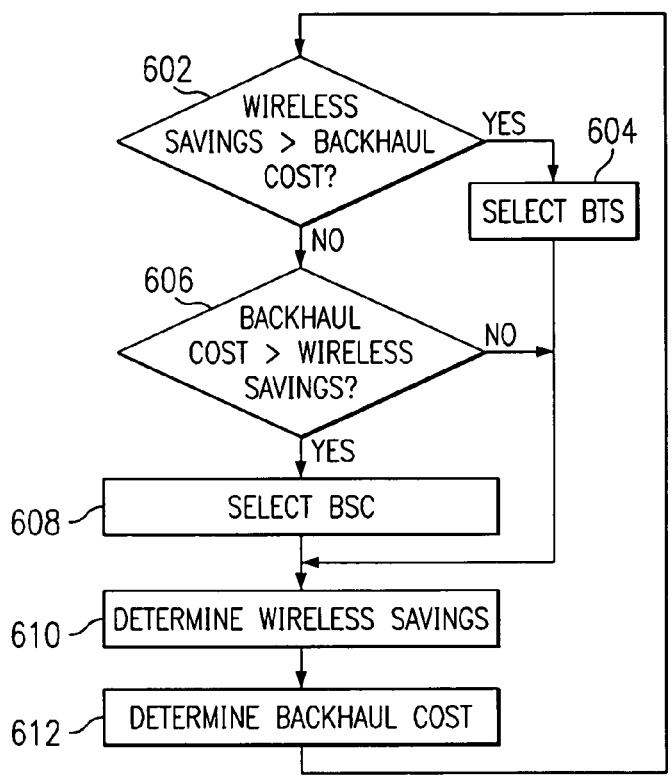
FIG. 6a is a flow diagram of an algorithm for selecting the location of a physical channel in accordance with the present invention.

An exemplary algorithm for determining the preferred location of the physical channel is illustrated in FIG. 6a. The algorithm determines the relative savings of wireless resources associated with performing the physical channel function at the BTS level, rather than the BSC level (step 610). The algorithm also determines the additional backhaul cost (i.e., the additional high-capacity line requirements) associated with performing the physical channel function at the BTS level (step 612). If the aforementioned wireless savings exceeds the aforementioned backhaul cost (step 602), the primary BTS is selected to perform the physical channel function (step 604). If, on the other hand, the backhaul cost exceeds the wireless savings (step 606), the BSC is selected as the site of the physical channel (step 608).

Figure 6B:
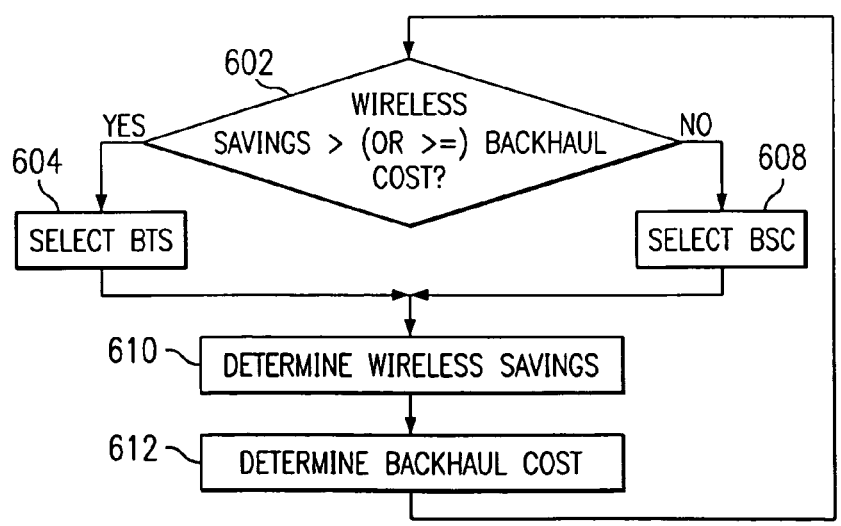
FIG. 6b is a flow diagram of an additional algorithm for selecting the location of a physical channel in accordance with the present invention.

In the exemplary algorithm of FIG. 6a, if neither of the wireless savings and the backhaul cost exceeds the other (steps 602 and step 606)—i.e., the wireless savings equals the backhaul cost—no change is made to the location of the physical channel. Alternatively, it is possible to use an algorithm which always selects a particular device if the wireless savings and the backhaul cost are equal. Such an algorithm is illustrated in FIG. 6b. In this algorithm, similarly to the algorithm illustrated in FIG. 6a, the wireless savings and the backhaul cost are determined (steps 610 and 612). In one configuration of step 602, if the wireless savings exceeds the backhaul cost, the BTS is selected (step 604); otherwise, the BSC is chosen (step 608). In an alternative configuration of step 602, the BTS is chosen (step 604) if the wireless savings is greater than or equal to the backhaul cost; otherwise, the BSC is chosen (step 608).

The procedures of FIGS. 6a and 6b can be iterated any number of times for each communication session (e.g., for each telephone call), or can be performed once per session. For cases in which a simpler procedure is required, it is preferable to perform the selection procedure once per session. On the other hand, for cases in which optimum efficiency of resource usage is desired, it is generally preferable to perform the selection procedure repeatedly in order to maintain the physical channel function in its optimal location. In addition, it is to be noted that the selected location of the physical channel function may be different for different calls and/or users. For example, the physical channel function for a first call may be located in the BSC, while at the same time, the physical channel function for a second call may be located in the primary BTS associated with the second call.

Figure 7B:
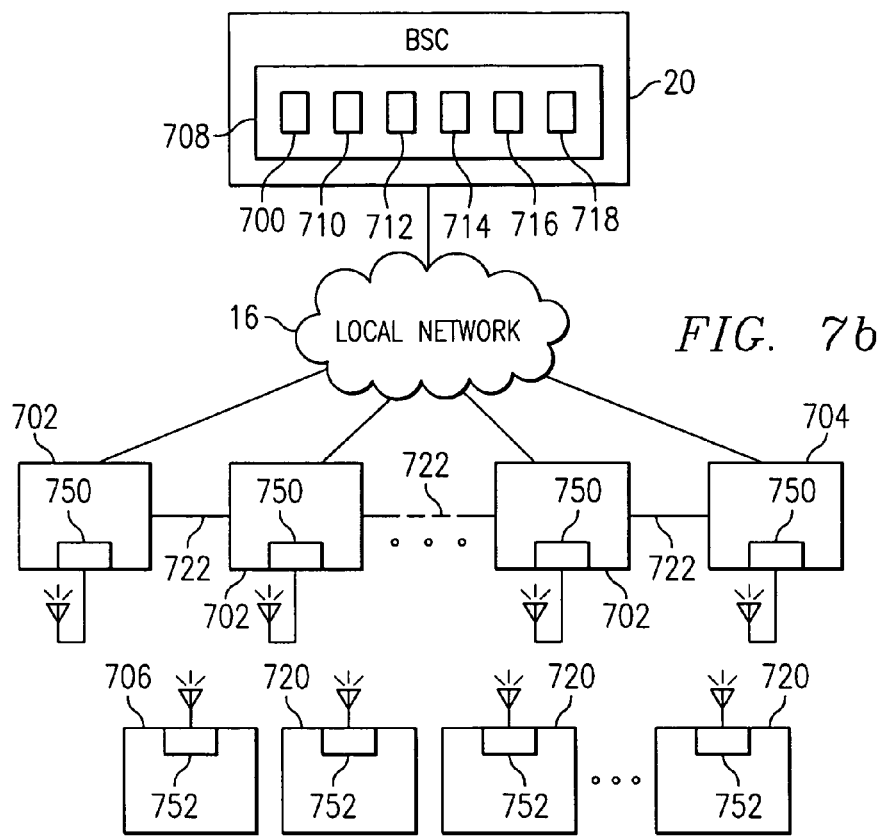
FIG. 7b is a block diagram of an additional cellular communication system in accordance with the present invention.

FIGS. 7a and 7b illustrate an exemplary communication system operated in accordance with the invention. The system includes a BSC 20, a primary BTS 704, secondary BTSs 702, and a network 16 providing communication among the BTSs 702 and 704 and the BSC 20. The primary BTS 704 and the secondary BTSs 702 are engaged in wireless communication with a first MU 706 and other MUs 720.

In FIG. 7a, a selection algorithm such as the algorithms illustrated in FIGS. 6a and 6b has selected the primary BTS 704 as the preferred location for the physical channel function 708. In FIG. 7b, the algorithm has selected the BSC 20 as the preferred location for the physical channel function 708. The physical channel function 708 preferably includes an SDU function 700, a wireless resource allocation function 710, a MUX function 712, a DEMUX function 714, a traffic channel termination function 716, and a BTS control channel termination function 718.

The BTSs 702 and 704 and MUs 706 and 702 typically include RF modems 750 and 752, respectively. The wireless resource allocation function 710 generally controls the wireless communication parameters of the BTSs 702 and 704 and the MUs 706 and 720, preferably by controlling the parameters of the RF modems 750 and 752. In particular, the wireless resource allocation function 710 controls baud rate settings of the RF modems 750 and 752. In addition, the wireless resource allocation function 710 allocates various wireless resources to the various links between MUs and BTSs. Such wireless resources typically include wireless frequency channels, spreading codes (e.g., Walsh codes), wireless power levels, and wireless communication time slots, as will be understood by those skilled in the art. The aforementioned wireless resources can be utilized more efficiently if the wireless resource allocation function 710 is located in the primary BTS 704, because if the primary BTS 704 performs the allocation function 710, there is no need to send to the BSC 20 information regarding: (1) changes in the characteristics of the data being communicated during the call, and/or (2) the location of the MU 706 being served by the various BTSs 702 and 704. Instead, allocation decisions can be made in the primary BTS 704 which is closer to the MU 706 and can therefore respond more quickly. The BTSs 702 and 704 communicate with each other through a logical or physical mesh 722 which transmits, among the respective BTSs 702 and 704, information regarding resource allocation. Allocation decisions are made quickly by the primary BTS 704 and communicated through the mesh 722 to the secondary BTSs 702. Because using the primary BTS 704 to perform the wireless resource allocation function 710 enables more rapid response, resource allocation can be more closely and efficiently matched to the changing characteristics of the data and the changing characteristics of wireless communication between the MU 706 and the BTSs 702 and 704.

The wireless resource savings associated with using the primary BTS 704 to perform the physical channel function 708—which includes the wireless resource allocation function 710—can be referred to as the "Resource Management Localization Capacity Gain" or "RMLCG." An exemplary method to calculate RMLCG assumes that a Physical Channel Resource Manager (PCRM) schedules the use of wireless resources in the forward and reverse link for each MU 706. In the traditional architecture, this PCRM is located with the physical channel termination point at the BSC 20 location. In the present invention, however, it can be located at the BTS 704. To maximize capacity, these wireless resources should be fully utilized (i.e., the time that a channel is idle should be minimized). Each MU 706 under control of a local network (i.e., a cell or set of cells) requests resources over-the-air by using a message on the reverse link. This message is processed by the local network, resources are allocated, and an optional acknowledgment is sent back to the MU 706 by the local network 16. The gateways 18 attached to the cellular system that carry data intended for the MU 706 can also request resources for example more bandwidth, and signal for these resources in a similar fashion as the MU 706 (except that the message is sent via the wired network to the local cellular network).

The data traffic patterns of the MU 706 are given to bursts of activity. A burst of data packets typically arrives at the MU 706, for example, upon the retrieval of an Internet web page, followed by relatively long periods of inactivity, such as the time during which the reader reads the web page. To maximize system capacity, resources are released when the user's session is inactive. Hence for a data application, each burst of traffic will result in a cycle of channel allocation, channel usage, and channel release. One advantage of capacity optimization is to minimize the Channel Allocation Time (CAT) and Channel Release Time (CRT). Minimizing the CAT reduces the user's perception of system delay, since until the channel is available, data traffic queued at either the gateway 18 or the MU 706 cannot be transmitted. Minimizing CAT also improves capacity since there will be a time lag between the time a resource is actually taken from the pool and the time that the MU 706 receives this allocation and uses it. Minimizing CRT improves system capacity, since neither the MU 706 that is releasing the resource nor other MUs 720 in the same local network 16 can use the channel until the CRT procedure is complete, and the resource is placed back into the resource pool.

The CAT procedure for a traditional network is presumed to consist of the following time components, although the order is not always exactly the same.

Step 1: The MU 706 sends a resource request message to the BTS 704.

Step 2: The BTS 704 forwards the resource request message to the BSC 20.

Step 3: The BSC. 20 allocates resources from the pool of available resources.

Step 4: The BSC 20 sends an allocate message to the BTS 704 or BTSs 702 and 704.

Step 5: The BTS 704 responds by indicating that a data channel is now in use.

Step 6: The BSC 20 sends a resource response message to the BTS 704.

Step 7: The BTS 704 forwards this message to the MU 706.

Step 8: The MU 706 responds to the BTS 704 by indicating that the channel is now in use.

Step 9: The MU 706 starts to transmit data on the data channel.

The CAT procedure for a local network with Resource Management Localization (RML) at the BTS 704 also begins with Step 1, in which a MU 706 sends a resource request message to a BTS 704. The CAT procedure with RML, however, permits the deletion of Steps 2, 4, 5, and 6.

The CRT procedure for a traditional network is presumed to consist of the following components, but the Steps may not necessarily occur in this precise order.

Step 1': The MU 706 has no more data to be sent on a data channel.

Step 2': The MU 706 sends a resource release message to the BTS 704.

Step 3': The BTS 704 forwards the resource release message to the BSC 20.

Step 4': The BSC 20 sends a resource response message to the BTS 704.

Step 5': The BTS 704 forwards the resource response message to the MU 706.

Step 6': The MU 706 responds to the BTS 704 by indicating that the data channel is not in use.

Step 7': The BTS 704 forwards the response to the BSC 20.

Step 8': The BSC 20 sends a de-allocate message to the BTS 704 or BTSs 702 and 704.

Step 9': The BTS 704 responds to the BSC 20 by indicating that the channel is not in use.

Step 10': The BSC 20 de-allocates resources from the pool.

The CRT procedure for a local network with Resource Management Localization (RML) at the BTS 704 also begins when an MU 706 has no more data to be sent on a channel and sends a resource release message to the BTS 704. The CRT procedure with RML, however, permits the deletion of Steps 3', 4', 7', 8', and 9'.

From the above it may be seen that the capacity loss during the CAT procedure between a traditional network and one using RML is the difference (or lag) in time between resource pool allocation and MU 706 usage for both scenarios, multiplied by the size of the channel (e.g., the data rate in both directions). In the traditional network Steps 4–8 define this lag. For a network employing RML, by contrast, the time lag is simply the length of Steps 7–8. Thus, the CAT capacity gain from using RML is given by (data rate)×(Step 4+Step 5+Step 6).

Similarly, the capacity loss during the CRT procedure between a traditional network and one with RML is measured by the difference (or lag) in time between MU 706 usage and resource pool addition for both scenarios multiplied by the size of the channel (e.g., data rate in both directions). In the traditional network Steps 2'–9' define the lag time. In a network employing RML, however, the lag time is simply the length of steps 2', 5', and 6'. Thus, the CRT capacity gain from using RML is given by (data rate)×(Step 3'+Step 4'+Step 7'+Step 8'+Step 9').

The total capacity gain (RMLCG) is given by the sum of CAT gain plus the CRT gain, or (data rate)×(Step 4+Step 5+Step 6+Step 3'+Step 4'+Step 7'+Step 8'+Step 9'). This RMLCG as described is expressed in bits (data rate×time). Other measures, however, are possible, such as energy, which is given by power×time. The total value of the wireless resources which are conserved by selecting the primary BTS 704 as the site of the physical channel 708 is $k_1$RMLCG, where $k_1$ is the unit value of wireless resources.

However, as discussed above, using the primary BTS 704 to perform the physical channel function 708 introduces additional backhaul cost because of the additional high-capacity communication line resources which are required to transmit the data. The additional required resources can be referred to as the "backhaul load loss" or "BLL." The value of the additional backhaul resources is $k_2$BLL, where $k_2$ is the unit value of additional high-capacity communication resources such as high-capacity lines. Therefore, the net savings associated with using the primary BTS 704, instead of the BSC 20, to perform the physical channel function 708 is:

$$S_1 = k_1 RMLCG - k_2 BLL. \tag{1}$$

If the net savings associated with performing the physical channel function at the BTS level is greater than zero (i.e., $S_1>0$), then the physical channel function should be performed by the primary BTS 704. If, on the other hand, the aforementioned savings is negative (i.e., $S_1<0$), then the physical channel function 708 should be performed by the BSC 20, because there is, in fact, a net loss associated with performing the physical channel function 708 at the BTS level.

Figure 8A:
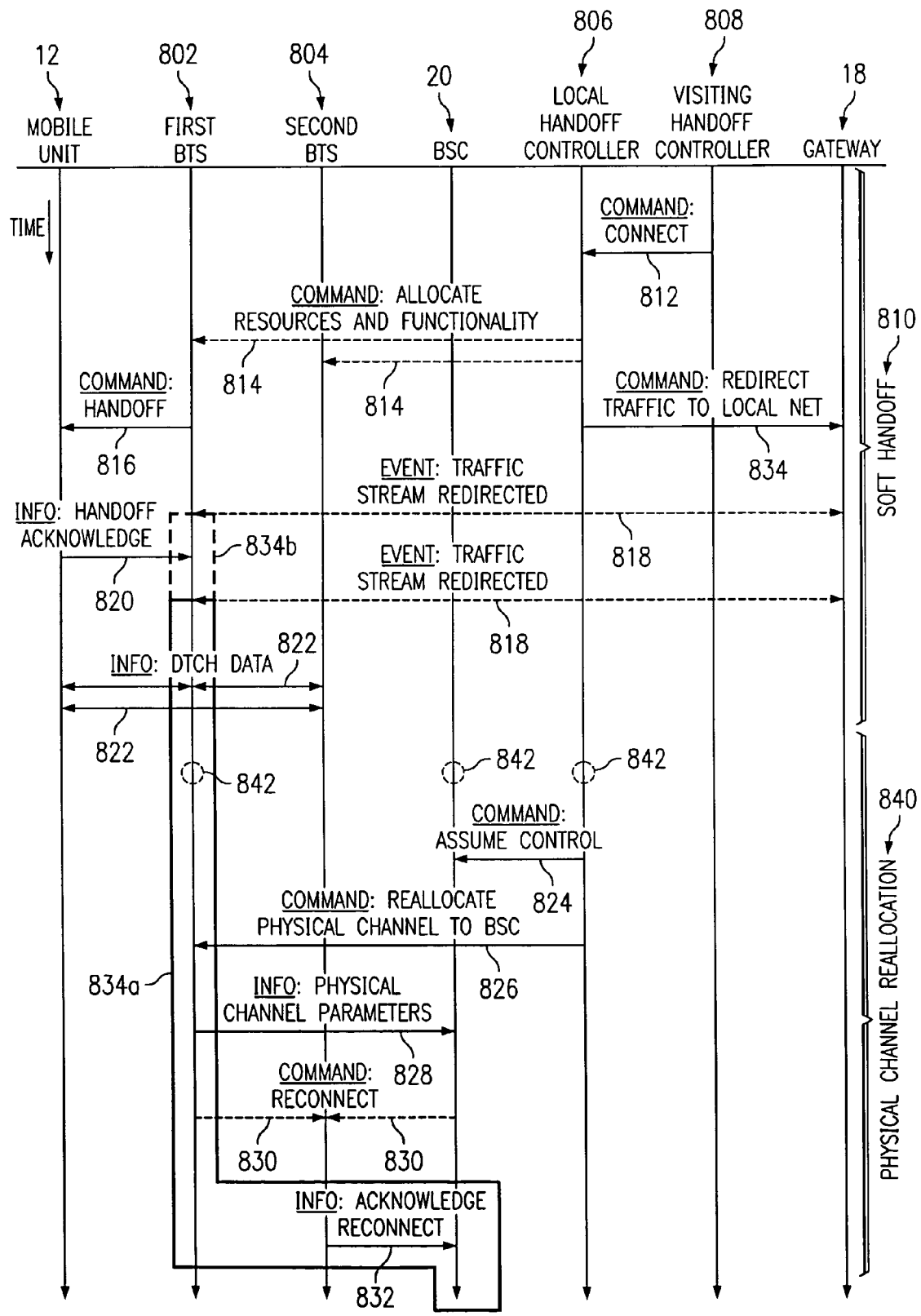
FIG. 8a is a time-line diagram of a procedure for soft handoff and reallocation of a physical channel in accordance with the present invention.

FIG. 8*a* illustrates an exemplary time sequence of soft handoff 810 and physical channel reallocation 840 in accordance with the invention. In the timeline of FIG. 8*a*, dotted lines are used to indicate sets of alternative events, commands, etc. which may occur. In the illustrated sequence, an MU 12 travels from a region controlled by a visiting handoff controller 808 and enters a local region controlled by a local handoff controller 806. The system of the local region includes a first BTS 802 and a second BTS 804 which are controlled by a BSC 20. The local handoff controller 806 can optionally be either a separate device or a component of the BSC 20. A gateway 18 carries data between the local network (item 16 in FIGS. 1 and 5) and outside portions (e.g., item 372 of FIG. 5) of the cellular network. When the MU 12 enters the local region, the visiting handoff controller 808 sends a command 812 to the local handoff controller 806 directing the local handoff controller 806 to connect the various local communication devices—i.e., the BSC 20 and the BTSs 802 and 804—to the mobile unit 12. The local handoff controller 806 sends a resource and functionality allocation command 814 to whichever of the BTSs 802 and 804 is to be designated as the primary BTS.

The BTS which is chosen to be the primary BTS (in this case, the first BTS 802) sends a command 816 to the MU 12 directing the MU 12 to participate in the handoff 810. The local handoff controller 806 sends a command 834 to the gateway 18, instructing the gateway 18 to redirect the data traffic to the local network 16. The MU 12 sends an acknowledgement 820 to the first BTS 802, indicating that the MU 12 is participating in the handoff procedure. The data traffic is redirected to the first BTS 802 which is to become the primary BTS for the current communication session (event 818). As indicated by the dotted lines, the redirection 818 of the traffic stream can, optionally, occur either before or after the handoff acknowledgement 820. Once the traffic stream has been redirected to the first BTS, the physical channel 834a—or, alternatively, 834b (dotted border) if the traffic stream is redirected before the handoff acknowledgement 820—is located within the first BTS 802 which is now serving as the primary BTS for the current communication session. The Dedicated Traffic Channel (DTCH) is a type of physical channel. It carries user data such as voice samples and Internet Protocol (IP) packets, as well as MU 12 control and signaling information by multiplexing these information flows onto the same physical channel. DTCH data 822 is exchanged among the first BTS 802, the second BTS 804, and the MU 12.

As indicated by the dotted circles, the physical channel location selection algorithm 842 of the present invention can be performed, optionally, by the local handoff controller 806, the BSC 20, or the first BTS 802. The selection algorithm determines the preferred location of the physical channel 834a. In this example, the algorithm is performed by the local handoff controller 806, which determines that the physical channel 834a should be reallocated to the BSC 20. The local handoff controller 806 therefore sends a command 824 to the BSC 20 directing the BSC 20 to assume control of the call. The local handoff controller 806 also sends a command 826 to the first BTS 802 directing the BTS 802 to reallocate the physical channel 834a to the BSC 20. The first BTS 802 sends the BSC 20 information 828 regarding the preferred parameters for the physical channel 834a. Optionally—as indicated by the dotted lines—either the BSC 20 or the first BTS 802 sends a command 830 to the second BTS 804, directing the second BTS 804 to reconnect to the MU 12. The second BTS 804 sends an acknowledgement 832 (in this case, to the BSC 20) indicating that the second BTS 804 has reconnected to the MU 12. Once the foregoing procedure has been performed, the physical channel 834a is now located within the BSC 20.

A cellular communication session (e.g., any form of electronic communication, including voice, data, or telematics) often takes place between two MUs which are in the same cell—i.e., served by the same BTS—or adjacent cells. In accordance with the present invention, for such a communication session, the location of the call anchor function can be chosen based upon various characteristics of the communication session, provided that the SDU function for the communication session is being performed by the BTS 704. Using a device remote from the BTS 702 and 704 to perform the call anchor function provides savings in wireless resources because a remote call anchor enables the system to perform soft handoff (SHO). such a remote call anchor introduces additional backhaul costs, however, because of the additional high-capacity line resources required to transport data between the primary BTS 704 and the secondary BTSs 702. Therefore, in accordance with the present invention, the call anchor location can be selected based upon the tradeoff between the additional backhaul cost and the aforementioned wireless savings associated with soft handoff. Preferably, the selected device is also configured to serve as a gateway 18 between the local network 16 and the Internet or a public switched telephone network (PSTN). For example, a mobile switching center (MSC) can be used as such a gateway, and can also perform the call anchor function.

Figure 6C:
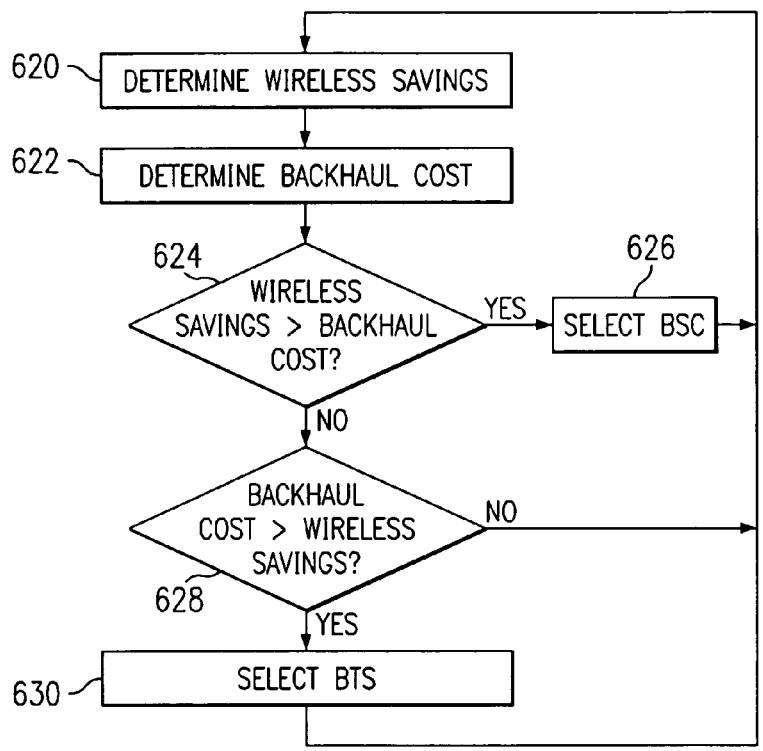
FIG. 6c is a flow diagram of an algorithm for selecting the location of a call anchor in accordance with the present invention.

An exemplary procedure for selecting a device to perform the call anchor function is illustrated in FIG. 6c. In the illustrated procedure, the quantity of wireless resources which can be saved by using the BSC to perform the call anchor function is determined (step 620). The cost of additional backhaul resources which would be required for the BSC, rather than the BTS, to perform the call anchor function is also determined (step 622). If the wireless savings exceeds the backhaul cost (step 624), the BSC is selected to perform the call anchor function (step 626). On the other hand, if the backhaul cost exceeds the wireless savings (step 628), the BTS is selected to perform the call anchor function (step 630). The procedure illustrated in FIG. 6c can be performed once for each communication session or user, or can be performed multiple times for one or more communication sessions or users.

Figure 6D:
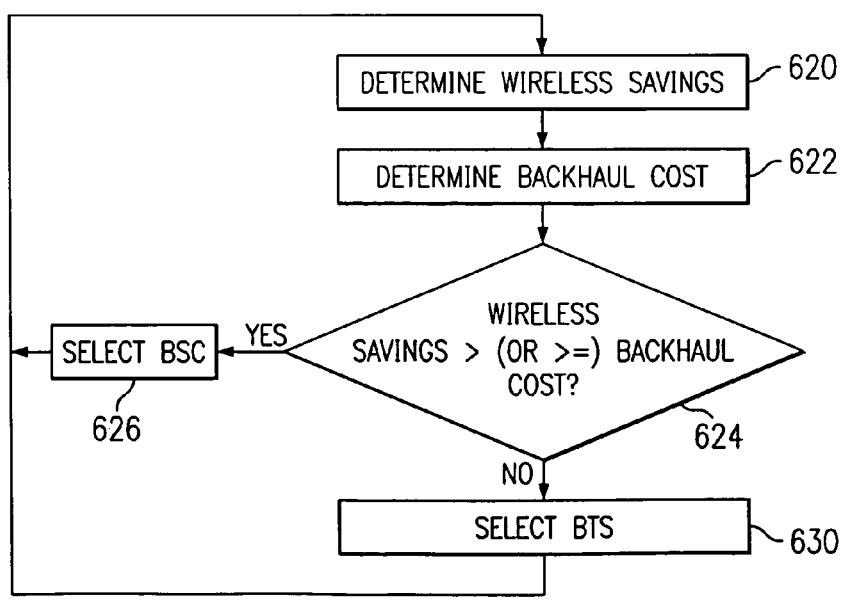
FIG. 6d is a flow diagram of an additional algorithm for selecting the location of a call anchor in accordance with the present invention.

FIG. 6d illustrates an additional procedure for selecting a device to perform the call anchor function in accordance with the present invention. Similarly to the procedure illustrated in FIG. 6c, the algorithm determines the wireless savings and backhaul cost associated with using the BSC to perform the call anchor function (steps 620 and 622). If the wireless savings exceeds the backhaul cost (step 624), the BSC is selected to perform the call anchor function (step 626). Alternatively, the procedure can be configured such that if the wireless savings is greater than or equal to the backhaul cost (in step 624), the BSC is selected (step 626). If the wireless savings does not exceed the backhaul cost (or, in the alternative configuration, is less than the backhaul cost), the BTS is selected (step 630).

The procedures of FIGS. 6c and 6d can be iterated any number of times for each communication session (e.g., for each telephone call), or can be performed once per session. In cases in where a simpler procedure is required, it is preferable to perform the selection procedure once per session. On the other hand, for cases in which optimum efficiency of resource usage is desired, it is generally preferable to perform the selection procedure repeatedly, in order to enable dynamic (i.e., real-time) allocation and modification of the location of the call anchor function 740. In addition, it is to be noted that the location of the call anchor function may be different for different calls and/or users. For example, the call anchor function 740 for a first call may be located in the BSC, while at the same time, the call anchor function for a second call may be located in the primary BTS associated with the second call.

Figure 7C:
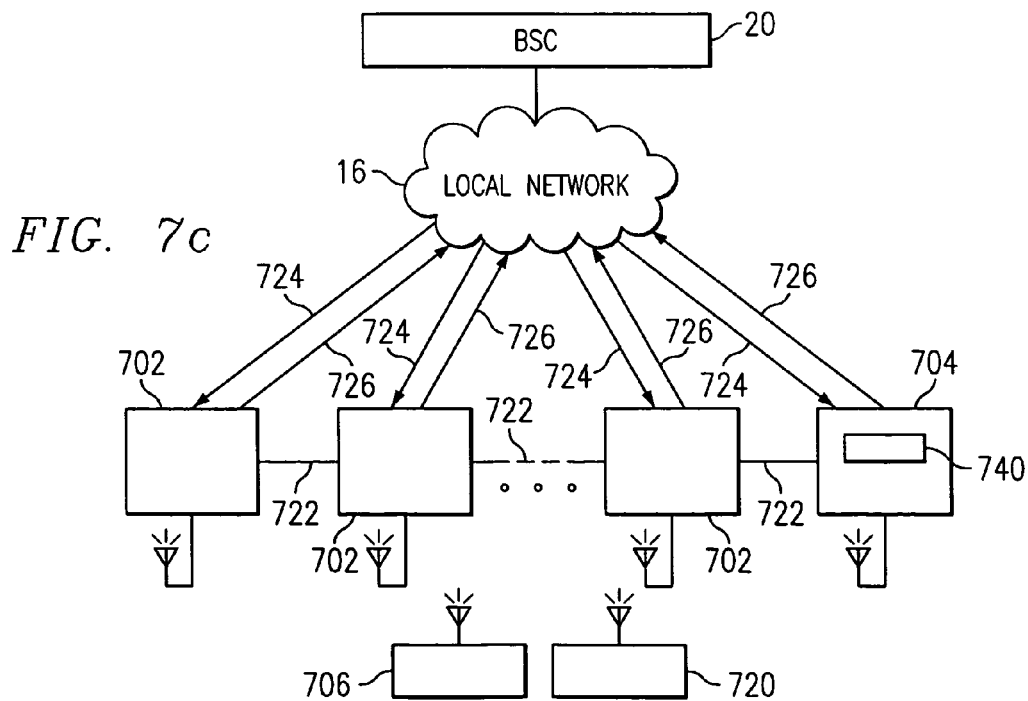
FIG. 7c is a block diagram of yet another cellular communication system in accordance with the present invention.
Figure 7D:
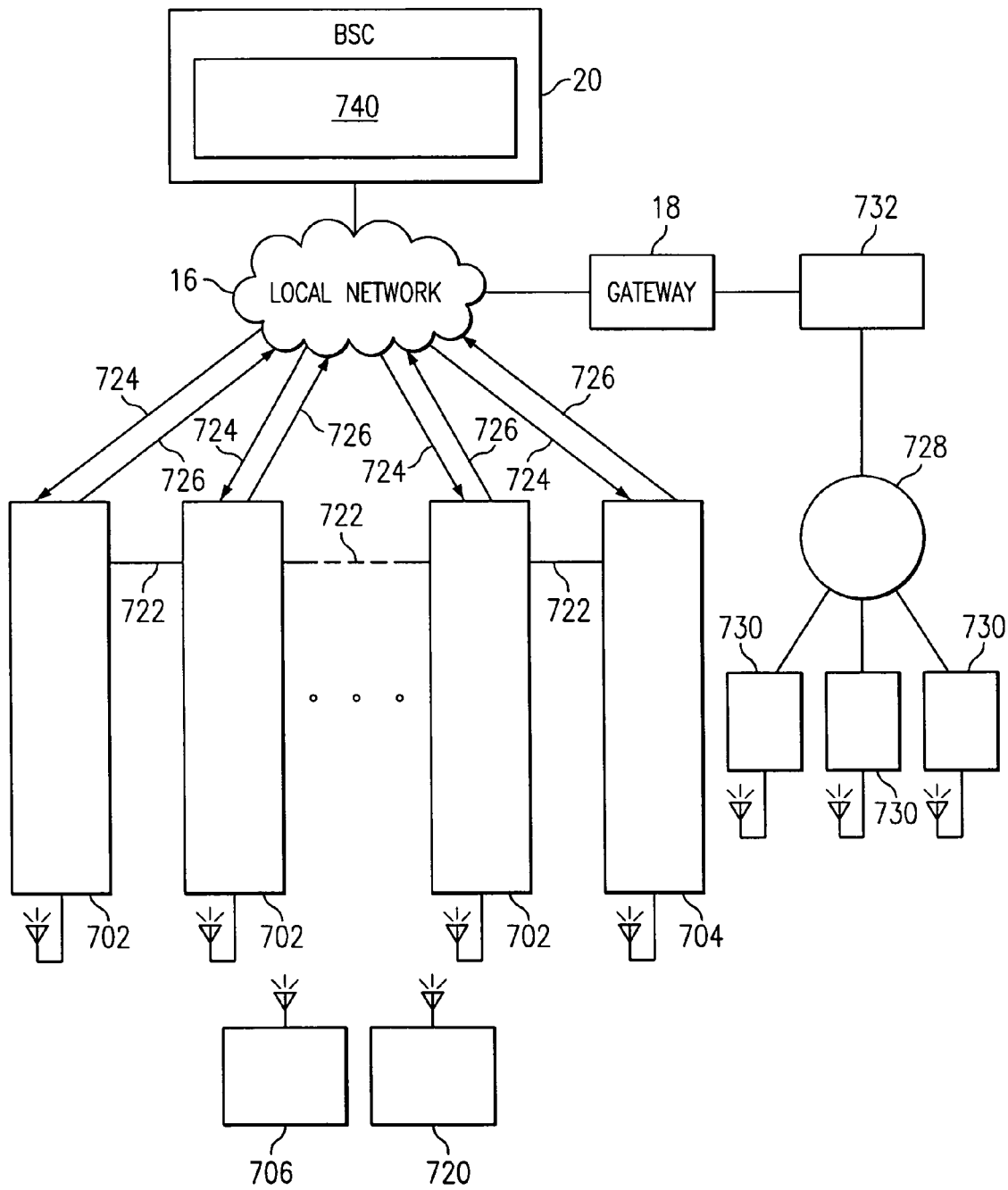
FIG. 7d is a block diagram of an additional cellular communication in accordance with the present invention.

FIGS. 7c and 7d illustrate the operation of an exemplary communication system operated in accordance with the invention. The system includes a BSC 20, a selected BTS 704, other BTSs 702, and a network 16 providing communication among the BTSs 702 and 704 and the BSC 20. The selected BTS 704 and the other BTSs 702 are engaged in wireless communication with an MU 706. In addition, the BTSs 704 and 702 can also be engaged in wireless communication with other MUs such as MU 720.

In FIG. 7c, a call anchor selection algorithm such as the algorithms illustrated in FIGS. 6c and 6d has chosen the selected BTS 704 as the preferable location for the call anchor function 740. In FIG. 7d, the algorithm has selected the BSC 20 as the preferred location for the call anchor function 740.

Macro diversity, or Soft Handoff (SHO) in a Code-Division Multiple Access (CDMA) system (e.g., IS-95, IS-95A, IS-95B, or IS-2000) is a radio interface process consisting of downlink diversity combining and uplink diversity selection. For purposes of illustration, two sectors, A and B, are envisioned that overlap each other by providing simultaneous coverage to a single MU 706. The MU 706 is said to be in soft-handoff with sectors A and B if it is simultaneously receiving and/or transmitting radio signals from/to both sectors using the same CDMA frequency (e.g., a 1.25 MHz-wide channel).

In the downlink sector A transmits a frame of data (bearer and control) on a dedicated traffic channel using spreading code A (e.g., Walsh code with a PN offset for that sector). Sector B also transmits the same frame of data at the same time using spreading code B (e.g., Walsh code with PN offset for that sector). Both sectors transmit a pilot channel (e.g., Walsh code 0 with PN offset for that sector) plus a power control command simultaneously with the the data frame using either a separate power control channel (i.e., separate spreading code) or by multiplexing the power control command with the dedicated traffic channel. The MU 706 acquires the pilot channels from both sector A and sector B and decodes the data frames from both traffic channels using the respective pilots as reference. Once de-spread, the resulting data frames are combined (e.g., bit-by-bit) resulting in one data frame with a potentially higher Signal to Interference Ratio (SIR) than any individual data frame. The MU 706 also de-multiplexes and then combines (e.g., logical OR) the power control command (i.e., up/down or 0/1) from both sectors in order to determine the Uplink Power Adjustment (ULPA). The ULPA is made in pre-established steps (e.g., 0.5 dB).

In the uplink the MU 706 transmits a frame of data (bearer and control) on a dedicated traffic channel (e.g., spreading code derived from the MU's Equipment Serial Number (ESN) with a PN offset dervied from the primary sector). Both sector A and sector B receive the signal from the MU 706 (i.e., both listen to the same spreading code), de-spread, decode, and measure the energy of the data frame (e.g., Received Signal Strength Indicator (RSSI)) and/or quality (e.g., Cyclic Redundancy Check (CRC)). The decoded data frames and relative energy/quality levels are used by the network to decide which of the data frames should be used to represent the received data frame (e.g., by comparing RSSI) for input to other higher-layer processes (e.g., Layer 2 framing, de-multiplexing). The MU 706 controls transmit power of this up-link traffic channel by using the ULPA.

In the reverse link diversity selection combined with ULPA results in less power being used to achieve a given SIR than without diversity selection under certain conditions. To calculate the reverse link capacity advantage, the energy required to achieve a given SIR at the BTS 704 receive antenna without diversity selection is first determined. First, a Hard Handoff (HHO) transition time interval $(0-T_s)$ is selected in which the MU 706 will transmit to either sector A or sector B (i.e., the MU 706 is in HHO with the network 16). During this time, the MU reverse link is under power control from the chosen sector. For the purposes of this calculation, during the time $T_s$ the MU 706 is presumed to be traveling at a constant velocity in a straight line between the transmit antenna of sector A and sector B. Other more advanced vectors may be used to achieve potentially more accurate results. The next step is to predict the path loss from MU 706 to sector A and sector B as a function of time, $P_a(t)$ and $P_b(t)$, within the time interval $T_s$. This is calculated by MU 706 measuring the pilot strength of sector A and B, respectively, and reporting the results back to the network 16. For the purposes of this calculation, we assume $P_a$ and $P_b$ can be expressed in terms of two linear equations: $P_a=P_{min}+(m_a)(t)$ and $P_b=P_{min}+(m_b)(t)$, where $P_{min}$, $m_a$, and $m_b$ are constants that model the physical channel. Other more advanced path models could be used in which case a more accurate prediction may be possible.

Next, for a time interval $0-G_a$, within $T_s$, estimate the MU 706 transmit power, $T_a(t)$, required to provide a sufficient received SIR via sector A for the selection process. Only during this time is sector A assumed to power control the MU 706 (i.e., uplink and downlink are balanced). For the purposes of this calculation, it is assumed that $T_a=(K_a)(P_a)$ while $t<G_a$. When $t>G_a$, the MU 706 is presumed to transmit at $T_{max}$. This models the transmit power limitation of certain CDMA devices. For the time interval, $G_b-T_s$, within $T_s$, estimate the MU 706 transmit power, $T_b(t)$, required to provide a sufficient received SIR via sector B for the selection process. Only during this time is sector B assumed to power control the MU 706 (i.e., uplink and downlink are balanced). For the purposes of this calculation, it is assumed that $T_b=T_{max}-(K_b)(P_a)$ while $t>G_b$. When $t<G_b$, the MU 706 is presumed to transmit at $T_{max}$. This models the transmit power limitation of certain CDMA devices.

Next, an intersection point, $I_t$, and related transmit power, I, are calculated using the previous equations for $T_a$ and $T_b$. The minimum transmit levels in the Soft Handoff (SHO) region are also calculated, $I_a$ at $G_a$, and $I_b$ at $G_b$.

The next step is to determine the SHO region $SHO_t=[G_a \ldots G_b]$. In this region the selection process could use either the received MU 706 signal from sector A or sector B, and both are presumed to power control the MU 706 (i.e., it combines the power control commands as above). The energy $(E_aUL)$ that would be required to support the MU 706 through the $SHO_t$ region if sector A were selected is given by $(G_a-G_b) \times [(T_{max}+I_a)/2]$. The energy $(E_bUL)$ required to support the MU 706 through the SHO period $(SHO_t)$ if sector B were selected is given by $(G_a-G_b) \times [(T_{max}+I_b)/2]$.

The final step is to estimate the energy necessary to support the MU 706 through the transition period if diversity selection (SHO) is used. During the transition period $T_s$, the selection process could use either sector A or sector B. The process of the claimed invention evaluates the best data frame every $S_i$ seconds, where interval i is presumed to be $<<T_s$. The uplink energy during SHO is calculated by assuming that $T_a$ and $T_b$ are unaffected by the use of diversity selection (i.e., sector A and sector B will power control the MU 706 independently of input or decisions made by each other). To calculate the total energy required inside the SHO region $(SHO_t)$, the MU 706 is presumed to be power controlled by both sectors in such a way that the lowest cost path ($P_a$ or $P_b$) is always used (e.g., at 400 Hz). This is given by $E_{sho}UL=(I_t-G_b) \times [(I+I_a)/2]+(G_a-I_t) \times [(I+I_b)/2]$.

Wireless resources can be utilized more efficiently if the call anchor function 740 is located in the BSC 20, because using the BSC 20 to perform the call anchor function 740 enables soft handoff techniques to be used, as discussed above. The wireless resource savings associated with enabling soft handoff can be referred to as the Frame Selection Diversity Gain (FSDG). The reverse link gain, or FSDG with respect to HHO with sector A or B can be expressed as $E_aUL-E_{sho}UL$ and $E_bUL-E_{sho}UL$, respectively. This calculation can be used to determine whether SHO should be used by the network or not (e.g., balanced against back-haul cost).

On the other hand, the aforementioned benefit (i.e., the FSDG) provided by soft handoff may be partially or completely offset by the loss of capacity caused by requiring one or more of the BTSs 702 and 704 to transmit data to more than one MU 706. This loss can be referred to as the Frame Distribution Capacity Loss or FDCL. In the reverse link the FDCL is based on the assumption that forward link power control (FPC) is not able to distinguish downlink power adjustments for sector A from adjustments for sector B. This results in imprecise power control in the downlink since individual energy sources (i.e., BTS transmit antennas) are not controlled relative to their path loss. The power control loop of the uplink and downlink are presumed to be of approximate speeds. This results in a transmit power model that is identical for uplink and downlink.

In such a system the composite power control command from the MU 706 indicates when the power from the composite signal from sector A and sector B is sufficient to meet the desired SIR requirements. To calculate the downlink capacity loss, the downlink energy requirements without diversity combining are first calculated. For the downlink the same path loss and transmit power model are assumed as the uplink (i.e., it is symmetric). Thus, $P_a=P_aDL$, $P_b=P_bDL$, $T_a=T_aDL$, and $T_b=T_bDL$. It is also assumed that a transmitter power limitation, $T_{max}DL$, applies to the downlink in a similar way as the uplink. In the downlink $T_{max}DL$ is set to limit inter-cell interference. The energy $E_aDL$ that would be required to support the MU 706 through the SHO region (SHOT) if sector A is selected is calculated by $(G_a-G_b) \times [(T_{max}DL+I_a)/2]$. The energy $E_bDL$ that would be required to support the MU 706 through the SHO region (SHOT) if sector B is selected is calculated by $(G_a-G_b) \times [(T_{max}DL+I_b)/2]$.

Next, the energy required in the SHO overlap region is calculated with diversity combining. Unlike the reverse link, the forward link of each sector is powered up if the total composite power is less than the required SIR, while the power of each sector is powered down if the required SIR has been exceeded. While the SIR of sector A is too low for de-spreading by the MU 706 (i.e., it is at maximum power but still cannot be de-spread), sector A's forward link, $T_a(t)$, is power controlled to minimal levels being increased as the MU 706 moves away from sector A's antenna and closer to sector B's. When sector B's transmit power becomes sufficient to de-spread (transmitting with power $T_{max}DL$ at time $t=G_b$), that energy is added to the signal from sector A. In the next Power Control (PC) cycle, at time $G_b+PC$, the received power at $t=G_b$ is presumed to be more than sufficient due to the addition of the contribution of sector B and, therefore, the DLPA command is to power down. This command is sent to both sector A and to B, and both back away from $T_a(G_b)$ and $T_{max}$, respectively, by one power control step. In the next PC cycle, if the MU 706 continues to move towards sector B, power will be slightly below SIR and the next command will be to power up to previous levels. Since $PC<<T_s$, this control loop will stabilize very quickly through the SHO region. Since power is only decreased if the sum of $T_a$ and $T_b$ falls below the SIR, the expected outcome is that the power control holds $T_a(t)=T_a(G_b)$ and $T_b(t)=T_{max}$ in the SHO region. Thus, $E_{sho}DL=(G_b-G_a) \times (I_a+T_{max})$, which is clearly larger than $E_aDL$ or $E_bDL$. The forward link gain, or FDCL with respect to HHO with sector A or B can be expressed as $E_{sho}DL-E_a$ and $E_{sho}DL-E_b$, respectively. This calculation can be used to determine whether SHO should be used by the network or not (e.g., balanced against back-haul cost).

The net benefit of using soft handoff is therefore the difference of the FSDG and the FDCL. This net benefit is equivalent to the relative cost of locating the call anchor in a BTS (i.e., not being able to use soft handoff), which can be referred to as the "border reach capacity loss" or "BRCL":

$$BRCL=FSDG-FDCL$$

Therefore, the total cost of the additional wireless resources which are expended by using the selected BTS 704 as the site of the call anchor function 740 is $k_1BRCL=k_1(FSDG-FDCL)$, where $k_1$ is the unit value of wireless resources. This additional cost of wireless resources can also be considered equivalent to the wireless resource savings which would be associated with using the BSC 20, rather than the BTS 704, as the site of the call anchor function 740.

On the other hand, as discussed above, using the selected BTS 704 to perform the call anchor function 740 reduces the required backhaul capacity, because additional high-capacity communication line resources would otherwise be required to transmit the data to and from the BSC 20 if the call anchor function 740 were located in the BSC 20. In addition, if the call anchor function is performed by the BTS 704, the backhaul is further reduced because data is typically compressed below the call anchor and uncompressed above the call anchor. If the call anchor function is performed by a lower-level device, there is reduced transmission of uncompressed data. The savings in backhaul capacity associated with using a BTS as a call anchor function 704 can be referred to as the "call routing load gain" or "CRLG." The value of the reduced backhaul resources is $k_2CRLG$, where $k_2$ is the unit value of additional high capacity resources. This value of reduced backhaul resources can also be considered equivalent to the additional cost of increased backhaul resources which would be expended if the BSC 20, rather than the BTS 704, were chosen to perform the call anchor function 740. The total value associated with using the selected BTS 704 to perform the call anchor function 740 is:

$$S_2=k_2CRLG-k_1BRCL=k_2CRLG-k_1(FSDG-FDCL). \qquad (2)$$

If the savings associated with performing the call anchor function 740 at the BTS level is greater than zero (i.e., $S_2>0$), then the call anchor function 740 should be performed by the primary BTS 704. If, on the other hand, the aforementioned savings is negative (i.e., $S_{2<0}$), then the call anchor function 740 should be performed by the BSC 20, because there is, in fact, a loss associated with performing the call anchor function 740 at the BTS level.

Figure 8B:
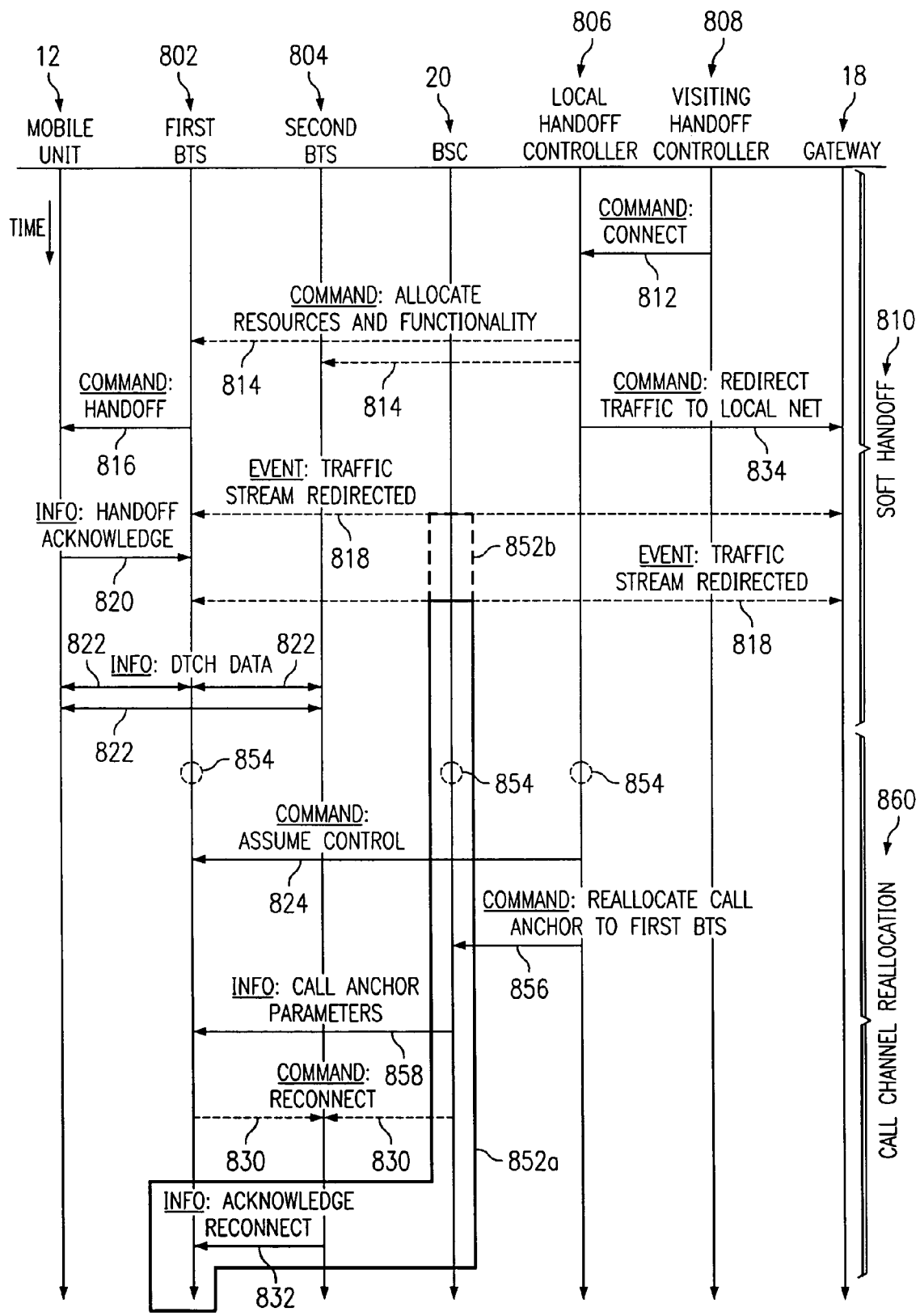
FIG. 8b is a time-line diagram of a procedure for soft handoff and reallocation of a call anchor in accordance with the present invention.

FIG. 8b illustrates an exemplary time sequence of soft handoff 810 and call anchor reallocation 860 in accordance with the invention. In the timeline of FIG. 8b, dotted lines are used to indicate sets of alternative events, commands, etc. which may occur. In the illustrated example, an MU 12 travels from a region of a cellular network controlled by a visiting controller 808 and enters a region controlled by a local controller 806. The local region includes a first BTS 802 and a second BTS 804 which are controlled by a BSC 20. A gateway 18 carries communications between the BSC 20 and outside portions of the cellular network. When the MU 12 enters the region of the local network, the visiting controller 808 sends a command 812 to the local controller 806 directing the local controller 806 to connect the local network to the mobile unit 12. The local controller 806 sends a resource and functionality allocation command 814 to whichever of the first and second BTSs 802 is to be designated as the primary BTS.

The BTS which is chosen to be the primary BTS (in this case, the first BTS 802) sends a command 816 to the MU 12 directing the MU 12 to participate in the handoff. The local controller 806 sends a command 834 to the gateway 18 directing the gateway to redirect the data traffic to the local network. The MU 12 sends an acknowledgement 820 to the first BTS 802, indicating that the MU 12 is engaging in the handoff procedure. The data traffic is redirected to the first BTS 802 (event 818). The redirection 818 of the traffic stream can, optionally, occur either before or after the handoff acknowledgement 820. In the illustrated example, the BSC 20 is the initial site of the call anchor 852 (or, alternatively, 852b if the traffic stream is redirected before the handoff acknowledgement 820). Dedicated traffic channel (DTCH) data 822 is exchanged among the first BTS 802, the second BTS 804, and the MU 12.

The call anchor location selection algorithm 854 of the present invention is performed, optionally, by the local controller 806, the BSC 20, or the first BTS 802, in order to determine the preferred location of the call anchor 852a. In this example, the algorithm is performed by the local controller 806, which determines that the call anchor 852a should be reallocated to the first BTS 802. The local controller 806 therefore sends a command 824 to the first BTS 802 directing the first BTS 802 to assume control over the call. The local controller 806 also sends a command 856 to the BSC 20 directing the BSC 20 to reallocate the call anchor 852a to the first BTS 802. The BSC 20 sends, to the first BTS 802, information 858 regarding the preferred parameters for the call anchor function 852a. Optionally, either the BSC 20 or the first BTS 802 sends a command 830 to the second BTS 804, directing the second BTS 804 to reconnect to the MU 12. The second BTS 804 sends an acknowledgement 832 (in this case, to the first BTS 802) indicating that the second BTS 804 has reconnected to the MU 12. Once the foregoing procedure has been performed, the call anchor function 852a is now located within the first BTS 802.

Generally, the call anchor function is preferably not situated in a lower-level device than the SDU function. Therefore, the call anchor function is typically situated within a BTS only if the SDU function is also situated within that particular BTS. It therefore follows that choosing the BTS to perform the physical channel function (which preferably includes the SDU function) can prevent the system from performing the call anchor function at the BTS level. Consequently, for conditions under which it would be advantageous to use a BTS to perform the call anchor function, the inability to use a BTS to perform the call anchor function is an additional drawback of using the BSC to perform the physical channel function. Accordingly, in a preferred embodiment of the present invention, this additional drawback is considered when deciding whether to use the BSC or a BTS to perform the physical channel function. In particular, if two MUs are in the same cell or adjacent cells while engaging in a communication session, then the algorithm first calculates $S_2$—using Eq. (2), above—and determines whether it would be advantageous to perform the call anchor function at the BTS level (i.e., determines whether $S_2>0$). If so, Eq. (1) is modified to account for $S_2$, which represents the net benefit of using a BTS to perform the call anchor function:

$$S_1 = k_1 RMLCG - K_2 BLL + S_2. \quad (3)$$

Figure 6E:
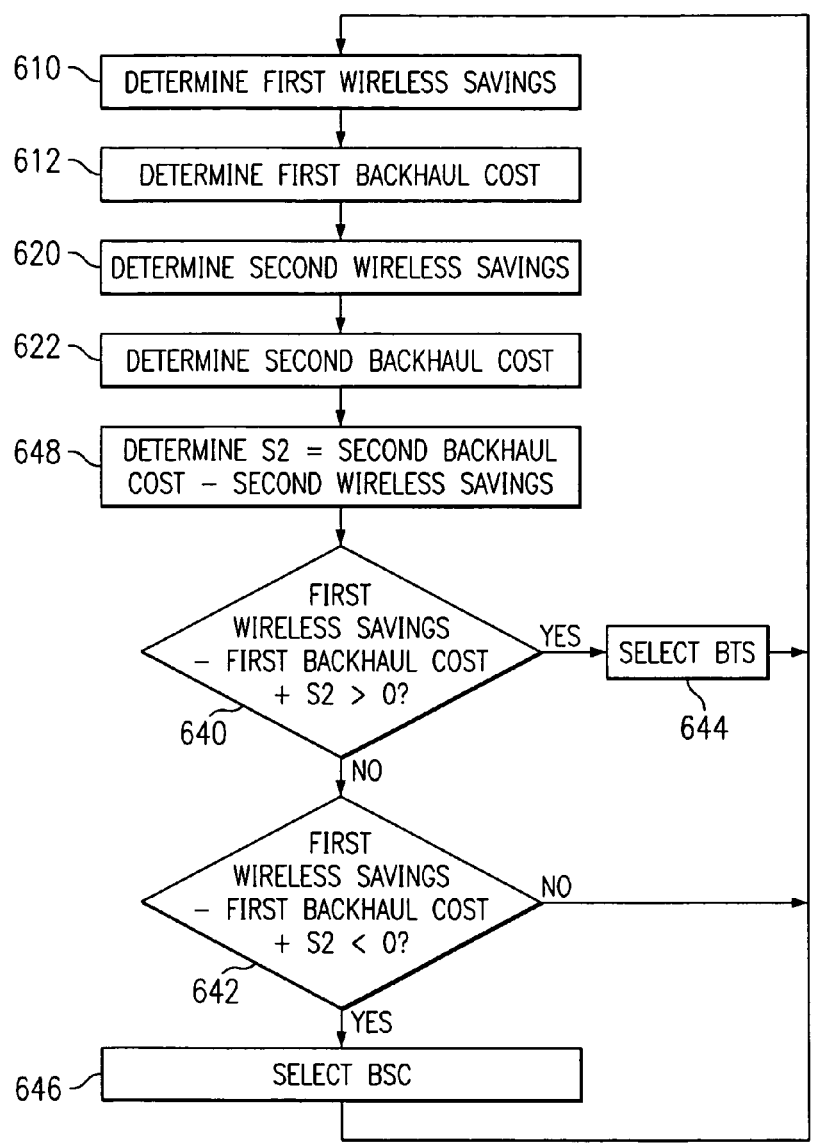
FIG. 6e is a flow diagram of an algorithm for determining whether to use the primary BTS or the BSC to perform the physical channel function.

Thus, in the above-described, preferred embodiment, the decision of whether to use the primary BTS or the BSC to perform the physical channel function takes into account the potential advantage of enabling the use of a floating call anchor. FIG. 6e illustrates an example of such an algorithm. The algorithm determines the relative savings of wireless resources associated with performing the physical channel function at the BTS level, rather than at the BSC level (step 610). This relative savings is referred to in FIG. 6e as the "first wireless savings." The algorithm also determines the additional backhaul cost associated with performing the physical function at the BTS level (step 612). This additional backhaul cost is referred to in FIG. 6e as the "first backhaul cost." In addition, the algorithm determines the quantity of wireless resources which can be saved by using the BSC, rather than a BTS, to perform the call anchor function (step 620). This quantity is referred to in FIG. 6e as the "second wireless savings." The algorithm also determines the cost of the additional backhaul resources which would be required for the BSC, rather than the BTS, to perform the call anchor function (step 622). This cost is referred to in FIG. 6e as the "second backhaul cost." The relative advantage (i.e., "$S_2$") of performing the call anchor function in the BTS, rather than the BSC, is determined (step 648). This relative advantage equals the second backhaul cost minus the second wireless savings. If the first wireless savings, minus the first backhaul cost, plus $S_2$, is greater than zero (step 640), then the BTS is selected to perform the physical channel function (step 644). On the other hand, if the first wireless savings, minus the first backhaul cost, plus $S_2$, is less than zero (step 642), then the BSC is selected to perform the physical channel function (step 646). Similarly to the procedures of FIGS. 6a–6d, the procedure illustrated in FIG. 6e can be iterated any number of times for each communication session, or can be performed once per session. For cases in which a simpler procedure is required, it is preferable to perform the selection procedure once per session. For cases in which optimum efficiency of resource usage is desired, it is generally preferable to perform the selection procedure repeatedly in order to maintain the physical channel function in its optimal location.

Figure 3:
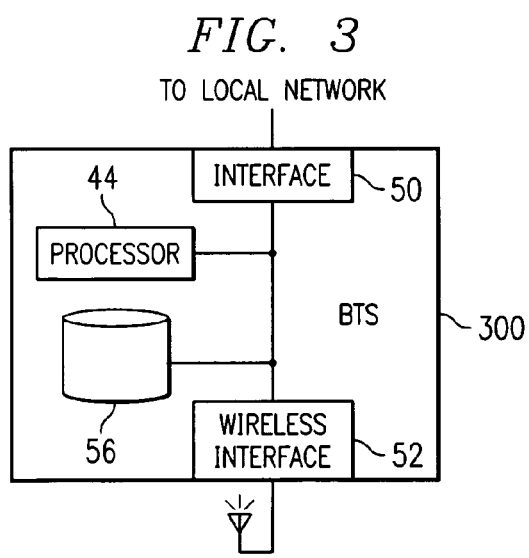
FIG. 3 is a block diagram of a BTS for use in the cellular communication system of FIG. 1.

FIG. 3 illustrates an example of a BTS for use in a cellular communication system in accordance with the invention. The BTS 300 includes an interface 50, a wireless interface 52, a processor 44, and a data storage device 56. The interface 50 couples the BTS 300 to the local network 16, and the wireless interface 52—which can be, e.g., an RF modem—couples the BTS 300 to one or more mobile units such as the mobile unit 12 illustrated in FIGS. 1 and 5. The data storage device 56 stores information for use by the other components of the BTS 300. Such information can include computer code for execution by the processor 44, and can also include information associating one or more MUs with multicast groups, time-slot assignments, frequency assignments, spreading code assignments, and/or other suitable information. The processor 44 manages and controls the operation of the various elements within the BTS 300.

Figure 4:
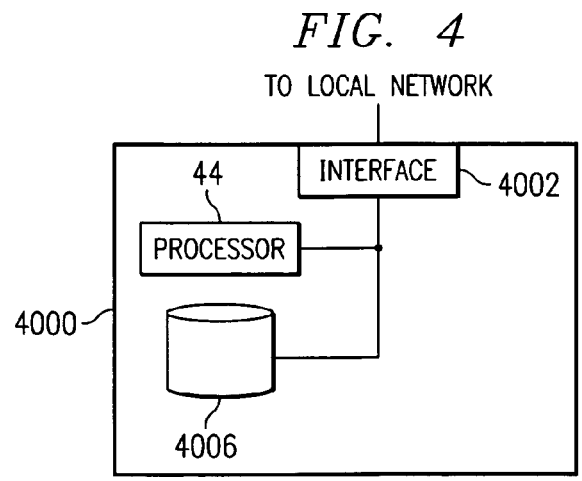
FIG. 4 is a block diagram of a controller for use in the cellular communication system of FIG. 1.
Figure 5:
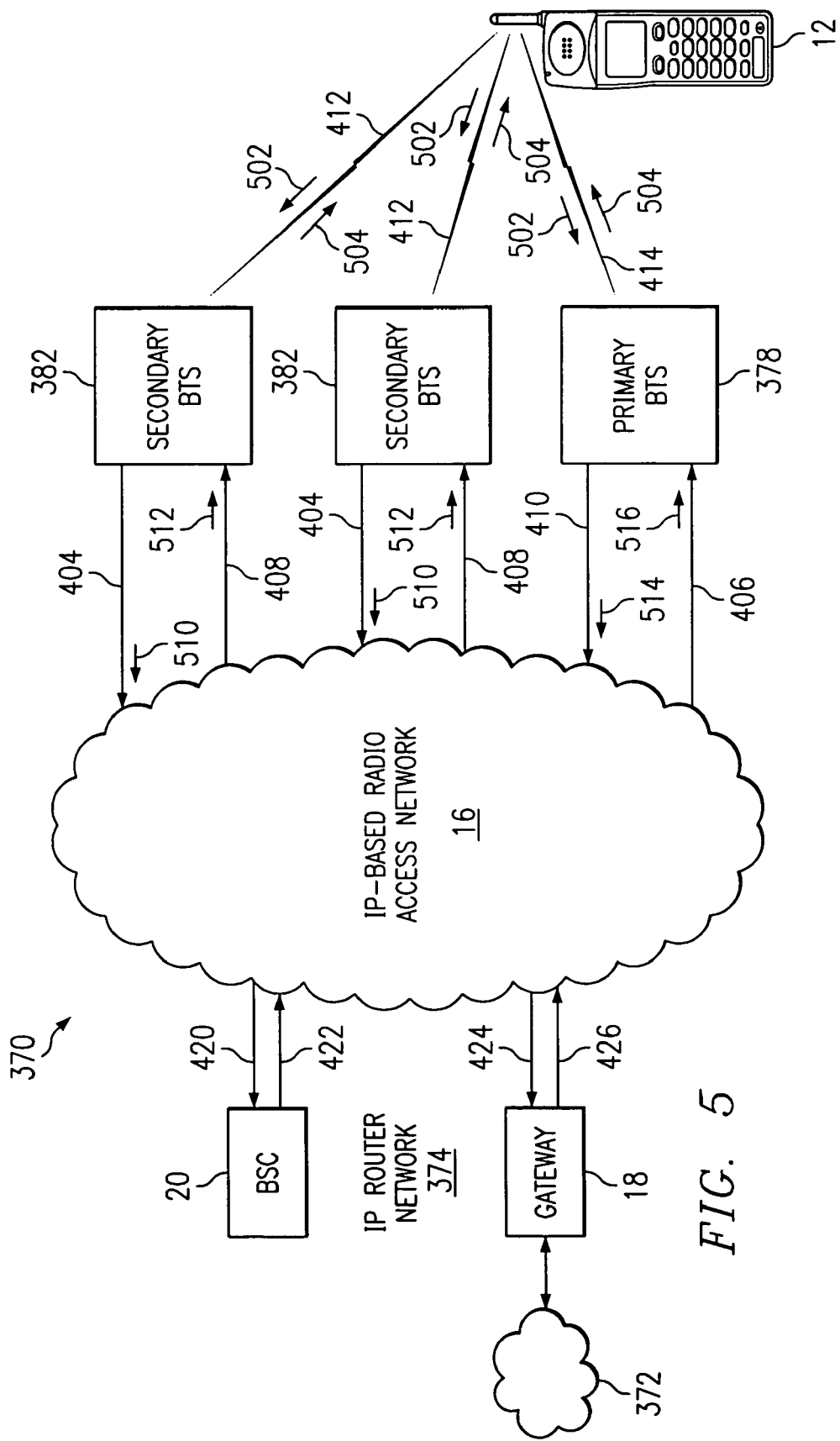
FIG. 5 is a block diagram of an additional cellular communication system.

FIG. 4 illustrates an example of a controller 4000 for use in a cellular communication system in accordance with the present invention. The controller 4000 illustrated in FIG. 4 can be, for example, a BSC 20 as illustrated in FIGS. 1 and 5, or can be a local handoff controller 806 as illustrated in FIG. 1. The controller 4000 includes an interface 4002, a processor 44, and a data storage device 4006. The interface 4002 connects the controller 4000 to the local network 16. The data storage device 4006 stores information for use by the other elements of the controller 4000. Such information can include computer code for execution by the processor 44. The processor 44 manages and controls the operation of the other components within the controller 4000.

Figure 2:
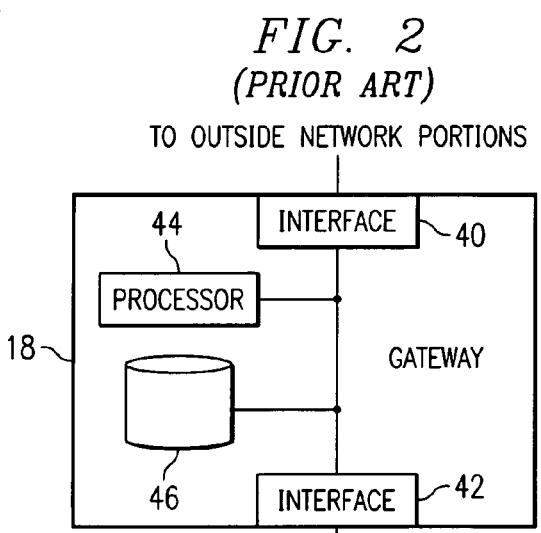
FIG. 2 is a block diagram of a gateway apparatus for use in the communication system of FIG. 1.
Figure 9:
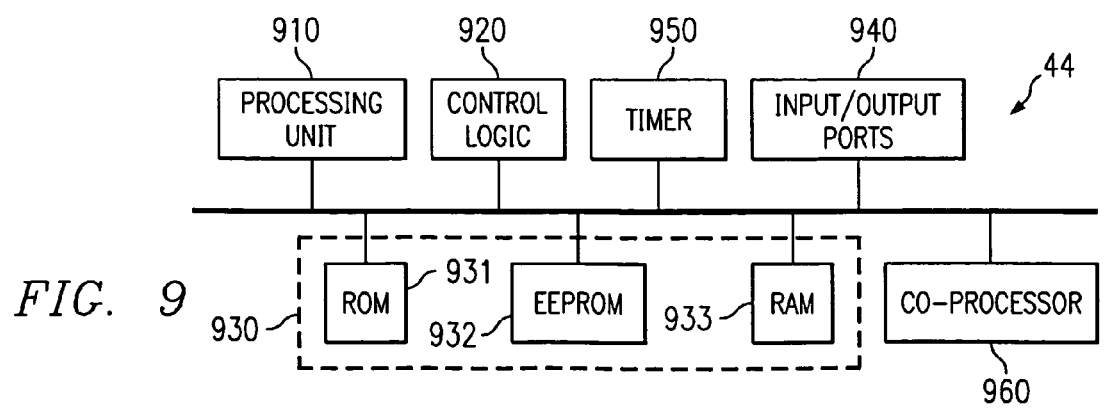
FIG. 9 is a block diagram of a processor for use in the gateway of FIG. 2, the BTS of FIG. 3, or the controller of FIG. 4.

FIG. 9 is a functional block diagram illustrating an example of a processor 44 for use in the gateway 18 illustrated in FIG. 2, the BTS 300 illustrated in FIG. 3, or the controller 4000 illustrated in FIG. 4. The processor 44 generally includes a processing unit 910, control logic 920, and a memory unit 930. Preferably, the processor 44 also includes a timer 950 and input/output ports 940. The processor 44 can also include a co-processor 960, depending on the microprocessor used in the processing unit 910. The control logic 920 provides, in conjunction with the processing unit 910, the control necessary to handle communications between the memory unit 930 and input/output ports 940. The timer 950 provides a timing reference signal for the processing unit 910 and the control logic 920. The co-processor 960 provides an enhanced ability to perform complex computations in real time, such as those required by the algorithms illustrated in FIGS. 6a–6d.

The memory unit 930 can include different types of memory, such as volatile and non-volatile memory and read-only and programmable memory. For example, as shown in FIG. 9, the memory unit 930 can include read-only memory (ROM) 931, electrically erasable programmable read-only memory (EEPROM) 932, and random-access memory (RAM) 933. Different processors, memory configurations, data structures, and the like can be used to practice the present invention, and the invention is not limited to a specific processor.

When included in a BSC such as the BSC 20 illustrated in FIGS. 1 and 5, or when used in a BTS such as the BTSs 14, 382, and 378 illustrated in FIGS. 1 and 5, the processor 44 illustrated in FIG. 9 can be used to perform a physical channel function such as described above. Furthermore, the processor 44 illustrated in FIG. 9, if included in a BSC, a BTS, or a local handoff controller—such as, for example, the BSC 20, the BTSs 14, 382, and 378 illustrated in FIGS. 1 and 5, or the local handoff controller 806 illustrated in FIG. 1—can be used to perform a physical channel selection procedure in accordance with the present invention, such as, for example, the procedures illustrated in FIGS. 6a and 6b.

In addition, when included in a BSC such as the BSC 20 illustrated in FIGS. 1 and 5, or when used in a BTS such as the BTSs 14, 382, and 378 illustrated in FIGS. 1 and 5, the processor 44 illustrated in FIG. 9 can be used to perform a call anchor function as described above. Furthermore, the processor 44 illustrated in FIG. 9, if included in a BSC, a BTS, or a local handoff controller—such as, for example, the BSC 20, the BTSs 14, 382, and 378 illustrated in FIGS. 1 and 5, or the local handoff controller 806 illustrated in FIG. 1—can be used to perform a call anchor selection procedure in accordance with the present invention, such as, for example, the procedures illustrated in FIGS. 6c and 6d.

Although the present invention has been described in connection with specific exemplary embodiments, it should be understood that various changes, substitutions, and alterations can be made to the disclosed embodiments without departing from the spirit and scope of the invention as set forth in the appended claims.

What is claimed is:

1. A communication system, comprising:
    a base transceiver station engaged in wireless communication with a first mobile unit and carrying data being transmitted between the first mobile unit and a second mobile unit; and
    a communication device in communication with the base transceiver station over a local network, wherein one of the base transceiver station and the communication device are dynamically selected, by a selection procedure, to perform a call anchor function for the data, the selection procedure comprising:
    determining a communication characteristic comprising at least one of a traffic characteristic of the data and a characteristic of wireless communication between the base transceiver station and at least one of the first and second mobile units;
    using the communication characteristic to determine a wireless savings amount comprising an amount of wireless resource savings associated with performing the call anchor function by the communication device;
    using the communication characteristic to determine a backhaul cost amount comprising an amount of backhaul resource cost associated with performing the call anchor function by the communication device;
    selecting the communication device if the wireless savings amount exceeds the backhaul cost amount; and
    selecting the base transceiver station if the backhaul cost amount exceeds the wireless savings amount.

2. A communication system, comprising:
    a base transceiver station engaged in wireless communication with a first mobile unit and carrying data being transmitted between the first mobile unit and a second mobile unit; and
    a communication device in communication with the base transceiver station over a local network, wherein a call anchor function for the data is dynamically relocated to one of the base transceiver station and the communication device by a selection procedure during data transmission between the first and second mobile units, the selection procedure including determining a communication characteristic having at least one of:
        a traffic characteristic of the data, and
        a characteristic of wireless communication between the base transceiver station and at least one of the first and second mobile units;
    wherein the selection procedure is performed for a first communication session, thereby generating a first selection result, the selection procedure being further performed for a second communication session, thereby generating a second selection result, and the first and second selection results being independent from each other.

3. A system according to claim 2, wherein the selection procedure is performed exactly once for at least one of the first and second communication sessions.

4. A system according to claim 2, wherein the selection procedure is performed at least twice for at least one of the first and second communication sessions.

5. A method for communicating, comprising:
    using a base transceiver station to engage in wireless communication with a first mobile unit;
    using the base transceiver station to carry data being transmitted between the first mobile unit and a second mobile unit;
    using a communication device to communicate with the base transceiver station over a local network;
    determining a communication characteristic comprising at least one of:
        a traffic characteristic of the data, and
        a characteristic of wireless communication between the base transceiver station and at least one of the first and second mobile units;

using the communication characteristic to dynamically select one of the base transceiver station and the communication device to perform a call anchor function for the data, wherein the step of using the communication characteristic comprises:
   using the communication characteristic to determine a wireless savings amount comprising an amount of wireless resource savings associated with performing the call anchor function by the communication device;
   using the communication characteristic to determine a backhaul cost amount comprising an amount of backhaul resource cost associated with performing the call anchor function by the communication device;
   selecting the communication device if the wireless savings amount exceeds the backhaul cost amount; and
   selecting the base transceiver station if the backhaul cost amount exceeds the wireless savings amount.

6. A method for communicating, comprising:
using a base transceiver station to engage in wireless communication with a first mobile unit;
using the base transceiver station to carry data being transmitted between the first mobile unit and a second mobile unit;
using a communication device to communicate with the base transceiver station over a local network;
determining a communication characteristic comprising at least one of:
   a traffic characteristic of the data, and
   a characteristic of wireless communication between the base transceiver station and at least one of the first and second mobile units; and
using the communication characteristic to dynamically relocate a call anchor function for the data to one of the base transceiver station and the communication device during data transmission between the first and second mobile units;
wherein the step of using the communication characteristic is performed for a first communication session, thereby generating a first selection result, the step of dynamically selecting being further performed for a second communication session, thereby generating a second selection result, and the first and second selection results being independent from each other.

7. A method according to claim 6, wherein the step of using the communication characteristic is performed exactly once for at least one of the first and second communication sessions.

8. A method according to claim 6, wherein the step of using the communication characteristic is performed at least twice for at least one of the first and second communication sessions.

9. A communication system, comprising:
means for engaging in wireless communication with a first mobile unit, the means for engaging in wireless communication comprising means for carrying data transmitted in a communication session between the first mobile unit and a second mobile unit;
means for communicating with the means for engaging in wireless communication;
means for determining a communication characteristic comprising at least one of a traffic characteristic of the data and a characteristic of wireless communication between the means for engaging in wireless communication and at least one of the first and second mobile units;
means for using the communication characteristic to dynamically select one of the means for communicating and the means for engaging in wireless communication to include means for anchoring the communication session, wherein the means for using the communication characteristic to dynamically select comprises:
   means for using the communication characteristic to determine a wireless savings amount comprising an amount of wireless resource savings associated with performing the call anchor function by the communication device;
   means for using the communication characteristic to determine a backhaul cost amount comprising an amount of backhaul resource cost associated with performing the call anchor function by the communication device;
   means for selecting the communication device if the wireless savings amount exceeds the backhaul cost amount; and
   means for selecting the base transceiver station if the backhaul cost amount exceeds the wireless savings amount.

10. A communication system, comprising:
means for engaging in wireless communication with a first mobile unit, the means for engaging in wireless communication comprising means for carrying data transmitted in a communication session between the first mobile unit and a second mobile unit;
means for communicating with the means for engaging in wireless communication;
means for determining a communication characteristic comprising at least one of:
   a traffic characteristic of the data, and
   a characteristic of wireless communication between the means for engaging in wireless communication and at least one of the first and second mobile units; and
means for using the communication characteristic to dynamically relocate a call anchor function for the data during data transmission between the first and second mobile units to one of the means for communicating and the means for engaging in wireless communication, wherein the means for using the communication characteristic comprises:
   first means for generating a first anchoring means selection result for a first communication session; and
   second means for generating a second anchoring means selection result for a second communication session, the first and second anchoring means selection results being independent from each other.

11. A system according to claim 10, wherein at least one of the first and second means for generating generates exactly one anchoring means selection result.

12. A system according to claim 10, wherein at least one of the first and second means for generating generates at least two anchoring means selection results.

13. A computer-readable medium having a set of instructions operable to direct a processor to perform the steps of:
using a base transceiver station to engage in wireless communication with a first mobile unit;
using the base transceiver station to carry data being transmitted between the first mobile unit and a second mobile unit;
using an communication device to communicate with the base transceiver station;
determining a communication characteristic comprising at least one of a traffic characteristic of the data and a characteristic of wireless communication between the base transceiver station and at least one of the first and second mobile units; and using the communication characteristic to dynamically select one of the base transceiver station and the communication device to perform a call anchor function for the data, wherein the step of using the communication characteristic comprises:

using the communication characteristic to determine a wireless savings amount comprising an amount of wireless resource savings associated with performing the call anchor function by the communication device;

using the communication characteristic to determine a backhaul cost amount comprising an amount of backhaul resource cost associated with performing the call anchor function by the communication device;

selecting the communication device if the wireless savings amount exceeds the backhaul cost amount; and selecting the base transceiver station if the backhaul cost amount exceeds the wireless savings amount.

14. A computer-readable medium having a set of instructions operable to direct a processor to perform the steps of:

using a base transceiver station to engage in wireless communication with a first mobile unit;

using the base transceiver station to carry data being transmitted between the first mobile unit and a second mobile unit;

using a communication device to communicate with the base transceiver station over a local network;

determining a communication characteristic comprising at least one of:
a traffic characteristic of the data,
a characteristic of wireless communication between the base transceiver station and at least one of the first and second mobile units; and using the communication characteristic to dynamically relocate a call anchor function for the data during data transmission between the first and second mobile units to one of the base transceiver station and the communication device;

wherein the step of using the communication characteristic is performed for a first communication session, thereby generating a first selection result, the step of dynamically selecting being further performed for a second communication session, thereby generating a second selection result, and the first and second selection results being independent from each other.

15. A computer-readable medium according to claim 14, wherein the step of using the communication characteristic is performed exactly once for at least one of the first and second communication sessions.

16. A computer-readable medium according to claim 14, wherein the step of using the communication characteristic is performed at least twice for at least one of the first and second communication sessions.

17. A communication system, comprising:
a first network;
a gateway connecting the first network to a second network;
a mobile unit;
a base transceiver station engaged in wireless communication with the first mobile unit and carrying data being transmitted between the first mobile unit and a second mobile unit, the base transceiver station being in communication with the first network;
a communication device in communication with the base transceiver station over the first network, wherein one of the base transceiver station and the communication device is dynamically selected, by a selection procedure, to perform a call anchor function for the data, the selection procedure comprising;

determining a communication characteristic comprising at least one of a traffic characteristic of the data and a characteristic of wireless communication between the base transceiver station and at least one of the first and second mobile units using the communication characteristic to determine a wireless savings amount comprising an amount of wireless resource savings associated with performing the call anchor function by the communication device;

using the communication characteristic to determine a backhaul cost amount comprising an amount of backhaul resource cost associated with performing the call anchor function by the communication device;

selecting the communication device if the wireless savings amount exceeds the backhaul cost amount; and selecting the base transceiver station if the backhaul cost amount exceeds the wireless savings amount.

18. A communication system, comprising:
a first network;
a gateway connecting the first network to a second network;
a first mobile unit;
a base transceiver station engaged in wireless communication with the first mobile unit and carrying data being transmitted between the first mobile unit and a second mobile unit, the base transceiver station being in communication with the first network; and
a communication device in communication with the base transceiver station over the first network, wherein a call anchor function for the data is dynamically relocated during data transmission between the first and second mobile units to one of the base transceiver station and the communication device by a selection procedure, the selection procedure comprising determining a communication characteristic comprising at least one of:
a traffic characteristic of the data, and
a characteristic of wireless communication between the base transceiver station and at least one of the first and second mobile units;
wherein the selection procedure is performed for a first communication session, thereby generating a first selection result, the selection procedure-being further performed for a second communication session, thereby generating a second selection result, and the first and second selection results being independent from each other.

19. A system according to claim 18, wherein the selection procedure is performed exactly once for at least one of the first and second communication sessions.

20. A system according to claim 18, wherein the selection procedure is performed at least twice for at least one of the first and second communication sessions.

* * * * *